United States Patent [19]

Blunck et al.

[11] Patent Number: 4,689,171

[45] Date of Patent: Aug. 25, 1987

[54] ANTHRAQUINONE DYESTUFFS, THEIR PREPARATION AND USE AND DICHROIC MATERIAL CONTAINING THESE ANTHRAQUINONE DYESTUFFS

[75] Inventors: Martin Blunck, Cologne; Uwe Claussen, Leverkusen; Friedrich W. Kröck, Odenthal; Rütger Neeff, Leverkusen, all of Fed. Rep. of Germany

[73] Assignee: Bayer Aktiengesellschaft, Leverkusen, Fed. Rep. of Germany

[21] Appl. No.: 774,112

[22] Filed: Sep. 9, 1985

Related U.S. Application Data

[63] Continuation of Ser. No. 485,098, Apr. 4, 1983, abandoned.

[30] Foreign Application Priority Data

May 3, 1982 [DE] Fed. Rep. of Germany ....... 3216455

[51] Int. Cl.$^4$ .................. C09K 19/10; C07C 97/24; C09B 1/16; G02F 1/13
[52] U.S. Cl. .................. 252/299.1; 260/377; 260/380; 260/381; 260/378; 350/349
[58] Field of Search ...................... 252/299.1; 350/349

[56] References Cited

U.S. PATENT DOCUMENTS

| | | | |
|---|---|---|---|
| 4,299,720 | 11/1981 | Osman et al. | 252/299.1 |
| 4,304,683 | 12/1981 | Morinaka et al. | 252/299.1 |
| 4,360,447 | 11/1982 | Morinaka et al. | 252/299.1 |
| 4,363,743 | 12/1982 | Moeller et al. | 252/299.1 |
| 4,376,715 | 3/1983 | Cognard et al. | 252/301.16 |
| 4,391,489 | 7/1983 | Harrison et al. | 350/349 |
| 4,428,858 | 1/1984 | Cognard et al. | 252/299.1 |
| 4,456,545 | 6/1984 | Weber et al. | 252/299.1 |
| 4,505,549 | 3/1985 | Shimidzu et al. | 350/349 |
| 4,585,574 | 4/1986 | Blunck et al. | 252/299.1 |

FOREIGN PATENT DOCUMENTS

| | | | |
|---|---|---|---|
| 0026004 | 4/1981 | European Pat. Off. | 252/299.1 |
| 0025809 | 4/1981 | European Pat. Off. | 252/299.1 |
| 0038460 | 10/1981 | European Pat. Off. | 252/299.1 |
| 1439370 | 8/1966 | France | 252/299.1 |
| 57-147575 | 11/1982 | Japan | 252/299.1 |
| 57-198777 | 12/1982 | Japan | 252/299.1 |
| 58-63778 | 4/1983 | Japan | 252/299.1 |
| 58-109578 | 6/1983 | Japan | 252/299.1 |
| 2037803 | 7/1980 | United Kingdom | 252/299.1 |

Primary Examiner—Teddy S. Gron
Assistant Examiner—Eric Jorgensen
Attorney, Agent, or Firm—Sprung Horn Kramer & Woods

[57] ABSTRACT

Dyestuffs of the formula

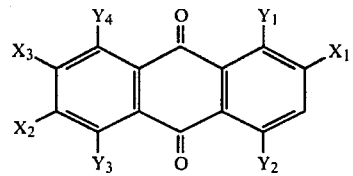

in which $Y_1$, $Y_2$, $Y_3$, $Y_4$ designate hydrogen, halogen, nitro, amino, alkylamino, arylamino, cycloalkylamino, aralkylamino, alkylthio, arylthio, cycloalkylthio, aralkylthio or hydroxyl, it being possible for the hydrocarbon radicals to be sustituted, with the proviso that (a) at least one of the substituents $Y_1$, $Y_2$, $Y_3$ or $Y_4$ does not denote hydrogen, (b) a maximum of two of the substituents $Y_1$, $Y_2$, $Y_3$ and $Y_4$ designate halogen and either (c$_1$) $X_1$, $X_3$ represent halogen, —$R_1$, —$OR_1$ or —$SR_1$, $R_1$ denoting optionally substituted alkyl, it being possible for the alkyl chain to be substituted by an oxygen atom or several non-adjacent oxygen atoms, optionally substituted aryl, optionally substituted cycloalkyl, optionally substituted aralkyl or an optionally substituted heterocyclic radical and $X_2$ designating hydrogen, or (c$_2$) $X_1$, $X_2$ denote halogen,

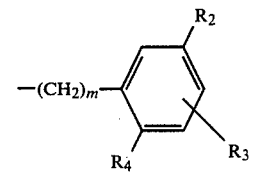

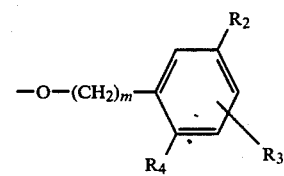

or

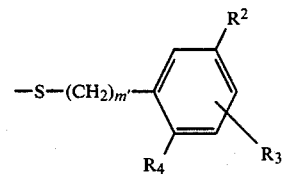

m' designating 0, 1, 2, or 3,
m designating 0, 2 or 3,
$R_2$ designating halogen, —$CF_3$, —CN, —$OR_1$, —$SR_1$, —$R_1$, $-CO_2R_1$, $-O-\overset{\text{O}}{\underset{\|}{C}}-R_1$, $-S-\overset{\text{O}}{\underset{\|}{C}}-R_1$, $-NH-\overset{\text{O}}{\underset{\|}{C}}-NHR_1$, (Abstract continued on next page.)

-continued
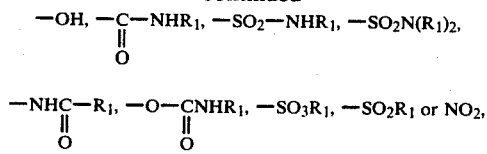
$R_3$ designating hydrogen or $R_2$ and
$R_4$ designating hydrogen, alkyl, halogen, alkoxy or $-CO_2R_1$ and
$X_3$ representing hydrogen, or
(c₃) $X_1$ designates halogen,
$X_2$ designates $-OR_1$ or $-SR_1$ and
$X_3$ designates hydrogen,
their preparation and use and dichroic material containing these anthraquinone dyestuffs.
13 Claims, No Drawings

ANTHRAQUINONE DYESTUFFS, THEIR PREPARATION AND USE AND DICHROIC MATERIAL CONTAINING THESE ANTHRAQUINONE DYESTUFFS

This is a continuation of application Ser. No. 485,098, filed Apr. 4, 1983, now abandoned.

The invention relates to anthraquinone dyestuffs of the formula

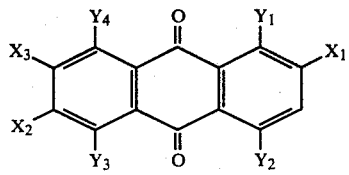

processes for their preparation, their use and dichroic material, preferably in the form of liquid-crystalline phases, containing these anthraquinone dyestuffs.

In formula I, $Y_1$, $Y_2$, $Y_3$, $Y_4$ denote hydrogen, halogen, nitro, amino, alkylamino, arylamino, cycloalkylamino, aralkylamino, alkylthio, arylthio, cycloalkylthio, aralkylthio or hydroxyl, it being possible for the hydrocarbon radicals to be substituted,
with the proviso that (a) at least one of the substituents $Y_1$, $Y_2$, $Y_3$ or $Y_4$ does not denote hydrogen, (b) a maximum of two of the substituents $Y_1$, $Y_2$, $Y_3$ and $Y_4$ designate halogen and either (c₁) $X_1$, $X_3$ represent halogen, $-R_1$, $-OR_1$ or $-SR_1$, $R_1$ denoting optionally substituted alkyl, it being possible for the alkyl chain to be substituted by an oxygen atom or several non-adjacent oxygen atoms, optionally substituted aryl, optionally substituted cycloalkyl, optionally substituted aralkyl or an optionally substituted heterocyclic radical and $X_2$ designating hydrogen, or (c₂) $X_1$, $X_2$ denote halogen,

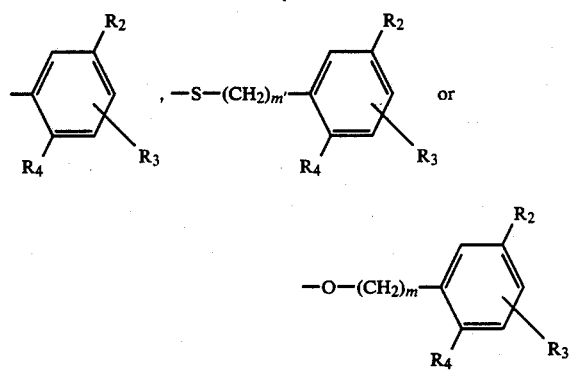

m' designating 0, 1, 2 or 3,
m designating 0, 2 or 3,
$R_2$ designating halogen, $-CF_3$, $-CN$, $-OR_1$, $-SR_1$, $R_1$, $CO_2R_1$, $-O-\underset{O}{\underset{\|}{C}}-R_1$, $-S-\underset{O}{\underset{\|}{C}}-R_1$, $-NH-\underset{O}{\underset{\|}{C}}-NHR_1$, -continued
$-OH$, $-\underset{O}{\underset{\|}{C}}-NH-R_1$, $-SO_2R_1$, $-SO_2N(R_1)_2$, $-NH\underset{O}{\underset{\|}{C}}-R_1$, $-O\underset{O}{\underset{\|}{C}}NHR_1$, $-SO_3R_1$, $-SO_2R_1$ or $NO_2$, $R_3$ designating hydrogen or the meaning of $R_2$ and
$R_4$ designating hydrogen, alkyl, halogen, alkoxy or $CO_2R_1$ and
$X_3$ representing hydrogen, or (c₃) $X_1$ denotes halogen,
$X_2$ denotes $-OR_1$ or $-SR_1$ and
$X_3$ denotes hydrogen.

Preferred dyestuffs correspond to the formula

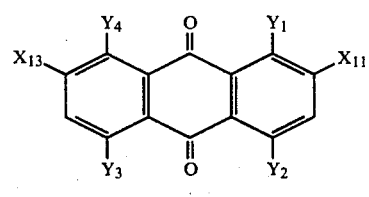

in which
$X_{11}$, $X_{13}$ denote halogen, $-R_{11}$, $-OR_{11}$ or $-SR_{11}$,
wherein
$R_{11}$ designates optionally substituted aryl or an optionally substituted heterocyclic radical and
$Y_1$, $Y_2$, $Y_3$, $Y_4$ have the meanings given for formula I under the conditions (a) and (b) given.

Also preferred are dyestuffs of the formula

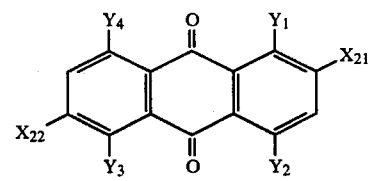

in which
$Y_1$, $Y_2$, $Y_3$ and $Y_4$ have the meanings given for formula I under the conditions (a) and (b) given and
$X_{21}$ and $X_{22}$ designate halogen,

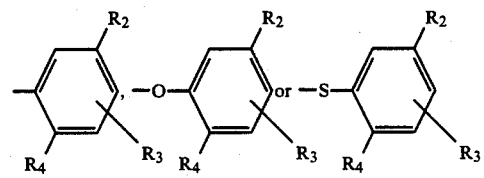

wherein
$R_2$, $R_3$ and $R_4$ have the meanings given above.

A particularly preferred group of dyestuffs coresponds to the formula

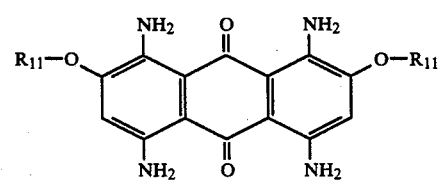

in which
$R_{11}$ has the meaning given for formula II.
Also preferred are dyestuffs of the formulae

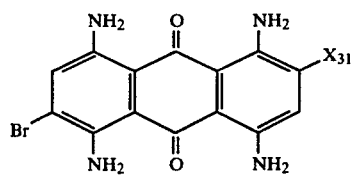 (V)

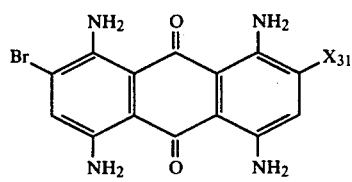 (VI)

in which
$X_{31}$ denotes $-OR_1$ or $-SR_1$ with the meaning for $R_1$ given for formula I.
Moreover, dyestuffs of the formula

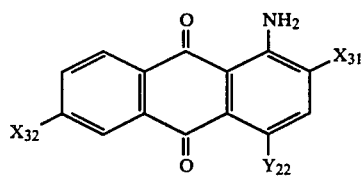 (VII)

are preferred, in which
$X_{31}$ has the meaning given for formula V,
$Y_{22}$ represents $-NH_2$ or $-OH$ and
$Y_{32}$ represents halogen, in particular chlorine.
Particularly preferred are dyestuffs of the formulae

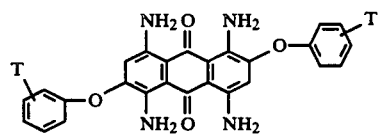 (VIII)

and

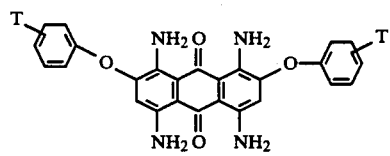 (IX)

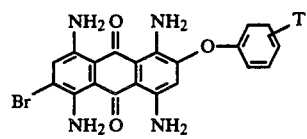 (X)

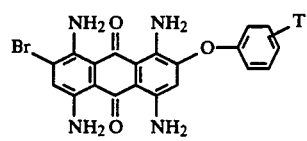 (XI)

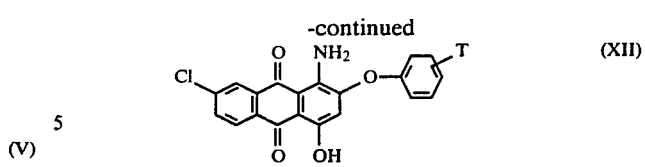

In formulae VIII–XV, T designates hydrogen, alkyl, it being possible for the alkyl chain to be interrupted by 1–3 non-adjacent O atoms, preferably $C_1$-$C_6$-alkyl, alkoxy, it being possible for the C chain of the alkoxy radical to be interrupted by 1–3 non-adjacent O atoms, preferably $C_1$-$C_6$-alkoxy, halogen, such as chlorine, bromine and, in particular, fluorine, $-CF_3$, $-CN$, alkylthio, in particular $C_1$-$C_6$-alkylthio, arylthio, in particular phenylthio, aryl, in particular phenyl, $-COOR_1$, in particular ($C_1$-$C_8$-alkoxy)carbonyl, cyclohexyloxycarbonyl, phenoxycarbonyl, benzyloxycarbonyl, $$-O-\underset{\underset{O}{\|}}{C}-R_1,$$

in particular ($C_1$-$C_8$-alkyl)carbonyloxy, cyclohexylcarbonyloxy and benzoyloxy.
Compounds of the formulae VIII–XV, in which T is in the meta-position, are of particular interest.
Also preferred are compounds of the formula

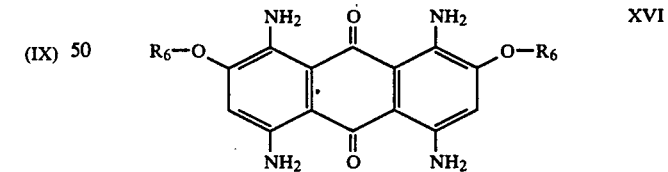 XVI in which
$R_6$ designates optionally substituted alkyl, optionally substituted cycloalkyl or optionally substituted aralkyl.
Preferred anthraquinone compounds according to the invention have, in addition to the substitution in the 2,6 or 2,7-positions, the following basic pattern of substitution in the α-positions (1,4,5 and 8):

TABLE 1

| 1 | 4 | 5 | 8 |
|---|---|---|---|
| S—φ | S—φ | S—φ | S—φ |
| S—φ | S—φ | S—φ | OH |

TABLE 1-continued

| 1 | 4 | 5 | 8 |
|---|---|---|---|
| S—φ | S—φ | S—φ | Cl |
| S—φ | S—φ | S—φ | H |
| S—φ | NH$_2$ | OH | S—φ |
| S—φ | NH$_2$ | CL | S—φ |
| S—φ | S—φ | NH$_2$ | NO$_2$ |
| S—φ | NH$_2$ | NO$_2$ | S—φ |
| S—φ | NH$_2$ | S—φ | NO$_2$ |
| S—φ | S—φ | OH | OH |
| S—φ | S—φ | OH | Cl |
| S—φ | OH | Cl | S—φ |
| S—φ | S—φ | OH | H |
| S—φ | OH | H | S—φ |
| S—φ | S—φ | Cl | H |
| S—φ | Cl | H | S—φ |
| S—φ | NH$_2$ | NH$_2$ | NO$_2$ |
| S—φ | NO$_2$ | NH$_2$ | NH$_2$ |
| S—φ | NH$_2$ | OH | OH |
| S—φ | OH | OH | NH$_2$ |
| S—φ | OH | NH$_2$ | OH |
| S—φ | H | H | NH$_2$ |
| S—φ | OH | OH | Cl |
| S—φ | Cl | OH | OH |
| S—φ | OH | Cl | OH |
| S—φ | OH | NO$_2$ | OH |
| S—φ | OH | OH | H |
| S—φ | H | OH | OH |
| S—φ | OH | H | OH |
| S—φ | OH | H | H |
| S—φ | H | OH | H |
| S—φ | Cl | H | H |
| S—φ | H | Cl | H |
| NH$_2$ | NH$_2$ | H | H |
| NH$_2$ | H | NH$_2$ | H |
| NH$_2$ | H | H | NH$_2$ |
| NH$_2$ | OH | H | H |
| NH$_2$ | H | OH | H |
| NH$_2$ | H | H | OH |
| NH$_2$ | NH$_2$ | OH | OH |
| NH$_2$ | OH | NH$_2$ | OH |
| NH$_2$ | OH | OH | NH$_2$ |
| NH$_2$ | NH$_2$ | NH$_2$ | OH |
| NH$_2$ | NH$_2$ | NH$_2$ | Cl |
| NH$_2$ | NH$_2$ | OH | Cl |
| NH$_2$ | OH | Cl | NH$_2$ |
| NH$_2$ | OH | NH$_2$ | Cl |
| NH$_2$ | NH$_2$ | OH | NO$_2$ |
| NH$_2$ | OH | NO$_2$ | NH$_2$ |
| NH$_2$ | OH | NH$_2$ | NO$_2$ |
| NH$_2$ | NH$_2$ | OH | H |
| NH$_2$ | OH | NH$_2$ | H |
| NH$_2$ | NH$_2$ | Cl | NO$_2$ |
| NH$_2$ | Cl | NO$_2$ | NH$_2$ |
| NH$_2$ | NH$_2$ | Cl | NO$_2$ |
| NH$_2$ | NH$_2$ | Cl | H |
| NH$_2$ | Cl | H | NH$_2$ |
| NH$_2$ | Cl | NH$_2$ | H |
| NH$_2$ | NO$_2$ | NH$_2$ | NO$_2$ |
| NH$_2$ | NH$_2$ | NO$_2$ | H |
| NH$_2$ | NO$_2$ | NH$_2$ | H |
| NH$_2$ | NH$_2$ | H | H |
| NH$_2$ | H | NH$_2$ | H |
| NH$_2$ | NO$_2$ | OH | NO$_2$ |
| NH$_2$ | NO$_2$ | Cl | NO$_2$ |
| NH$_2$ | Cl | H | H |
| NH$_2$ | H | Cl | H |

Particularly preferred 2,6- or 2,7-disubstituted anthraquinone compounds have the following basic pattern of substitution in the α-positions:

TABLE 2

| 1 | 4 | 5 | 8 |
|---|---|---|---|
| S—φ | S—φ | S—φ | NH$_2$ |
| S—φ | S—φ | NH$_2$ | NH$_2$ |
| S—φ | NH$_2$ | NH$_2$ | S—φ |
| S—φ | NH$_2$ | S—φ | NH$_2$ |

TABLE 2-continued

| 1 | 4 | 5 | 8 |
|---|---|---|---|
| S—φ | S—φ | NH$_2$ | OH |
| S—φ | NH$_2$ | S—φ | OH |
| S—φ | S—φ | NH$_2$ | Cl |
| S—φ | NH$_2$ | S—φ | Cl |
| S—φ | S—φ | NH$_2$ | H |
| S—φ | NH$_2$ | H | S—φ |
| S—φ | NH$_2$ | S—φ | H |
| S—φ | OH | S—φ | OH |
| S—φ | OH | S—φ | Cl |
| S—φ | OH | S—φ | H |
| S—φ | Cl | S—φ | H |
| S—φ | S—φ | H | H |
| S—φ | H | S—φ | H |
| S—φ | NH$_2$ | NH$_2$ | NH$_2$ |
| S—φ | NH$_2$ | NH$_2$ | OH |
| S—φ | OH | NH$_2$ | NH$_2$ |
| S—φ | NH$_2$ | OH | NH$_2$ |
| S—φ | NH$_2$ | NH$_2$ | Cl |
| S—φ | Cl | NH$_2$ | NH$_2$ |
| S—φ | NH$_2$ | Cl | NH$_2$ |
| S—φ | NH$_2$ | NO$_2$ | NH$_2$ |
| S—φ | NH$_2$ | NH$_2$ | H |
| S—φ | H | NH$_2$ | NH$_2$ |
| S—φ | NH$_2$ | H | NH$_2$ |
| S—φ | NH$_2$ | H | H |
| S—φ | H | NH$_2$ | H |
| NH$_2$ | NH$_2$ | NH$_2$ | NH$_2$ |
| NH$_2$ | NH$_2$ | NH$_2$ | NO$_2$ |

The radicals indicated in Tables 1 and 2 and designated by —S—φ can, for example, be aryl radicals substituted by alkyl, cycloalkyl, aryl, halogen, alkoxy or —COOR$_1$, in particular phenyl radicals, preferred radicals being C$_1$-C$_4$-alkyl radicals, such as methyl and t-butyl or chlorine. However, the radicals designated by —S—φ can also be alkylthio, cycloalkylthio or aralkylthio radicals.

In addition to the basic patterns of substitution detailed in Tables 1 and 2, the following substituents, in particular, are in positions 2,6 or 2,7: —OCH$_3$, —OC$_2$H$_5$, OC$_3$H$_7$, —OC$_4$H$_9$, —SCH$_3$, —SC$_2$H$_5$, —SC$_3$H$_7$, —SC$_4$H$_9$, F, Cl, Br.

In a particularly preferred manner, in the positions 2,6 or 2,7 are located one or two substituents of the formula

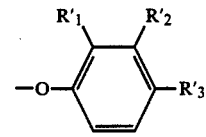

in which R$_1'$, R$_2'$ and R$_3'$ preferably have the following meanings:

R$_1'$: H, C$_1$-C$_8$-alkyl, preferably methyl, C$_1$-C$_8$-alkoxy, preferably methoxy and ethoxy, F, or Cl;

R$_2'$: H, C$_1$-C$_8$-alkyl, preferably methyl, C$_1$-C$_8$-alkoxy, preferably methoxy and ethoxy, phenyl, F, Cl, CN, —CH$_2$CH$_2$CN, (C$_1$-C$_8$-alkoxy)carbonyl, C$_1$-C$_8$-alkylthio, in particular methylthio and ethylthio;

R$_3'$: H, C$_1$-C$_8$-alkyl, it being possible for the alkyl chain to be interrupted by non-adjacent O atoms, preferably methyl, C$_1$-C$_8$-alkoxy, preferably methoxy and ethoxy, phenyl, F, Cl, CN, —CH$_2$CH$_2$CN, (C$_1$-C$_8$-alkoxy)carbonyl, preferably pentyloxycarbonyl, C$_1$-C$_8$-alkylthio, in particular methylthio and ethylthio.

The following areas of preference apply to the general definitions of substituents detailed in the foregoing text: halogen-chlorine, bromine or fluorine; alkylamino-$C_1$-$C_6$-alkylamino, in particular methylamino and ethylamino; arylamino-phenylamino and naphthylamino; cycloalkylamino-$C_3$-$C_7$-cycloalkylamino, in particular cyclopentylamino and cyclohexylamino; aralkylamino-phenyl-$C_1$-$C_4$-alkylamino and naphthyl-$C_1$-$C_4$-alkylamino, in particular benzylamino and phenethylamino; alkylthio-$C_1$-$C_6$-alkylthio, in particular methylthio and ethylthio; arylthio-phenylthio and naphthylthio; cycloalkylthio-$C_3$-$C_7$-cycloalkylthio, in particular cyclopentylthio and cyclohexylthio; aralkylthio-phenyl-$C_1$-$C_4$-alkylthio and naphthyl-$C_1$-$C_4$-alkylthio, in particular benzylthio and phenethylthio; alkyl-$C_1$-$C_6$-alkyl, it being possible for the alkyl chain to be interrupted by non-adjacent O atoms, in particular methyl and ethyl; aryl-phenyl and naphthyl; cycloalkyl-$C_3$-$C_7$-cycloalkyl, in particular cyclopentyl and cyclohexyl; aralkyl-phenyl-$C_1$-$C_4$-alkyl and naphthyl-$C_1$-$C_4$-alkyl, in particular benzyl and phenethyl, alkoxy-$C_1$-$C_6$-alkoxy, it being possible for the C chain of the alkoxy radical to be interrupted by 1–3 non-adjacent O atoms, in particular methoxy and ethoxy; optionally substituted heterocyclic radical-radical of a five- or six-membered heterocyclic ring which contains 1, 2 or 3 ring atoms from the series comprising N, O or S, and onto which a benzene ring can be fused.

Examples of suitable substituents for alkyl and cycloalkyl are $C_1$-$C_4$-alkoxy, $C_1$-$C_4$-alkylthio, hydroxyl, phenoxy, phenyl and halogen, preferably fluorine, chlorine or bromine.

Examples of suitable substituents for aryl or for the aryl moiety in aralkyl are halogen, preferably fluorine, chlorine and bromine, $C_1$-$C_4$-alkyl, $C_1$-$C_4$-alkoxy, $C_1$-$C_4$-alkylthio, —$NO_2$, —CN, —$CF_3$, $C_1$-$C_4$-alkylamino and $C_1$-$C_4$-dialkylamino. Examples of suitable substituents for the heterocyclic radicals are halogen, such as fluorine, chlorine and bromine, $C_1$-$C_4$-alkyl, phenyl, $C_1$-$C_4$-alkoxy and $C_1$-$C_4$-alkylthio.

The abovementioned substituents for alkyl, aryl, cycloalkyl and aralkyl are also suitable when these radicals are part of combined radicals, such as alkylamino, arylamino, cycloalkylamino, aralkylamino, alkylthio, arylthio, cycloalkylthio and aralkylthio.

The new anthraquinone dyestuffs are prepared by processes which are known per se. Thus, for example, the compounds of the types V and VI are obtained by a phenolate fusion, optionally also in an aprotic dipolar solvent, of 1,5-diamino-4,8-ditosylamino-2,6-dibromoanthraquinone or 1,8-diamino-4,5-ditosylamino-2,7-dibromoanthraquinone under mild conditions, preferably at 80°–130° C. and subsequent splitting off of the tosyl radicals in sulphuric or phosphoric acid.

The dyestuffs of type VII, in which $Y_{22}$ denotes an amino group, can be prepared correspondingly, for example, from 1-amino-6-chloro or -7-chloroanthraquinone by dibromination, careful tosylamide fusion in amyl alcohol, in which only the bromine atom in the 4-position is exchanged, subsequent phenolate fusion and splitting off tosyl groups. Dyestuffs of the formula VII, in which $Y_{22}$ denotes an hydroxyl group, are obtained, for example, by dibromination of the same starting materials, fusion in boric acid/sulphuric acid and subsequent phenolate fusion.

Dyestuffs of the formulae VIII and IX, in particular those in which T is in the meta-position, are prepared correspondingly to the dyestuffs V and VI, but the phenolate fusion is carried out until halogen exchange is complete, if necessary at higher temperature. The phenoxy groups introduced by phenolate fusion into the dyestuffs of the formulae V–IX can be exchanged for the appropriate alkoxy groups, if appropriate at the stage of the tosylamides, that is to say before splitting off the tosyl radicals, by treatment with alcohols and alkali, for example potassium carbonate, optionally in a protic, polar medium, for example $\epsilon$-caprolactam.

In general, the compounds are produced in insufficient purity for their use in liquid-crystal compositions, so that additional purification measures, such as recrystallisation, column chromatography or liquid-liquid partition, are necessary.

The invention also relates to dichroic material, preferably in the form of liquid-crystalline phases, containing at least one dyestuff of the formulae I–XVI. The liquid-crystal compositions are preferentially used in electro-optical display elements.

The dyestuffs used according to the invention have excellent photochemical stability, a high order parameter and, to an outstanding extent, a colour density in liquid-crystalline materials which is high enough for industrial use. The properties mentioned are of crucial importance for their suitability as dyestuffs in electro-optical display elements working by the guest-host principle (German Offenlegungsschrift No.) 3,028,593).

As a rule, electro-optical display elements consist of 2 glass plates arranged parallel (5–50$\mu$ apart). To their inner faces are attached electrodes, between which the liquid-crystalline material is embedded. The ability of an electro-optical display to function depends on the oriented structure of the liquid crystals which can be changed by the electric field applied.

The oriented structure of the liquid-crystalline materials can be communicated to suitable dyestuffs, so that these participate in the structure as "guests".

The dyestuffs according to the invention are used in guest-host displays, the construction and method of working of which are known (Heilmeyer et al., Mol. Crystals and Liquid Cryst. 8, 293–309 (1969), (German Offenlengungsschrift No.) 2,639,675 and (German Offenlegungsschrift No.) 2,568,568), as a solution in a nematic liquid-crystal mixture. The liquid-crystalline material acting as the host phase contains at least one dyestuff of the formula I and can also contain other dyestuffs. The latter can either have dichroic properties or not. The solution consists of about 0.01 to about 30% by weight, preferably about 0.1 to about 10% by weight, of dyestuff (as guest) and of the host phase, which principally consists of nematic liquid-crystalline material and can contain other additives, for example for cholesteric orientation.

Accordingly, the invention also relates to liquid-crystalline materials which contain anthraquinone dyestuffs of the formula (I). The liquid-crystalline material preferably has positive dielectric anisotropy and can be employed in electro-optical display devices.

Of the various states of order of liquid-crystalline materials, the nematic and cholesteric, corresponding to the definitions as are given, for example, by R. Steinstrasser and L. Pohl, Angew. Chem. 85, 706 (1973) are preferred.

In the field-free state, two orientations of the liquid-crystalline material can be distinguished, and these depend on the characteristics of the phase boundary and thus on the pre-treatment of the glass plates. Depending on whether the long axis of the molecules of which the liquid-crystalline phase is composed is directed at right angles or parallel to the surface of the plate, the texture is referred to as being homeotropic or homogeneous. The production techniques to obtain suitable surfaces are known (Ullmann, 4th edition (1976) volume XI, page 657 et seq.). The dielectric anisotropy depends on the dipole properties of the liquid-crystalline compounds. It is positive when the electric field brings about homeotropic alignment and negative when this is homogeneous. The use of the dyestuffs according to the invention in liquid-crystalline materials having positive dielectric anisotropy is preferred. Examples of suitable liquid-crystalline materials are mixtures of alkyl(-cyanobiphenyl), alkoxy(cyanobiphenyl), alkyl(-cyanoterphenyl), alkyl(cyanophenylcyclohexane) (PCH), alkylbiphenylcyclohexane (BCH), azoxy compounds, Schiff's bases, phenyl benzoates, phenyl thiobenzoates and terpyrimidines. Eutectic mixtures of the liquid crystals are customarily employed, it being possible for the ratios of mixing and the components of the mixture to vary within wide limits. Some mixtures of this type are commercially available. For the preparation of a display, liquid-crystal systems based on alkyl-4-cyanobiphenyl, alkyl-4-cyanophenylpyrimidine and alkyl-4-cyanophenylcyclohexane, for example mixtures consisting predominantly of 4'-n-pentyl-4-cyanobiphenyl, 4'-n-heptyl-4-cyanobiphenyl, 4'-n-octyl-4-cyanobiphenyl and 4'-n-pentyl-4-cyanoterphenyl and of trans-4-heptyl(4-cyanophenyl)cyclohexane, trans-4-pentyl(4-cyanophenyl)cyclohexane and trans-4-propyl(4'-cyanobiphenyl)cyclohexane, for example, are preferred.

Examples of liquid-crystal mixtures which should be mentioned as being commercially available and suitable for positive dielectric anisotropy are products based on cyanopyrimidines and cyanoesters and mixtures of BCH, PCH and PCH esters and PCH, BCH, BCH esters and terphenyl (for example "Ro-TN-402", "Ro-TN-103", "Merok 1221 TNC", "Merck 1291 TNC", "Merck 1691", "Merck 1840").

In addition to the liquid-crystalline compounds and the dyestuff, the liquid-crystalline material can contan other customary additives, for example optically active compounds which can convert a nematic phase into a cholesteric phase or substances to decrease the threshold potential etc.

The quality of the guest-host interaction can be specified by the mean deviation of the dyestuff molecules from the preferred direction set up by the molecules of the liquid-crystalline material. An order parameter S can be defined which takes the mean deviation into account and assumes the value 1.0 for perfect order. In practice, this value is never reached, the S values being <1.0. The values reported in the literature cannot be directly compared because of different techniques of measurement. The definition of the order parameter and its significance is described by D. L. White and G. N. Taylor, J. Appl. Phys. (5) 1974, 4718–4723 or, for example, in European Offenlegungsschrift No. 2,104.

Dyestuffs having high order parameters are particularly valuable for industrial use. However, a number of other properties must also be present. The photochemical stability must be very good and the colour shade should not change or fade in light. In addition, good chemical stability in the complex composition of the liquid-crystalline medium is required. Finally, the dyestuff must have a high colour density and should not crystallise even at continuous low temperatures.

It is obvious that there are not many materials which fulfil all these properties in a satisfactory manner. A necessary prerequisite for the utilisability of the dyestuffs is the dichroism of the light absorption as a function of the orientation of the host liquid crystal.

It is particularly difficult to make the dyestuffs sufficiently soluble while retaining the dichroic fastness and colour properties. A large number of tests is necessary just to optimise the solubility, and this property can only be predicted very imperfectly.

Anthraquinones have been known in the literature for some time as dichroic dyestuffs, for example from the references German Offenlegungsschrift No. 2,363,219, U.S. Pat. No. 3,864,022, U.S. Pat. No. 3,975,285, German Offenlegungsschrift No. 2,418,364, German Offenlegungsschrift No. 2,815,335, European Patent Application No. 126,004 and European Patent Application No. 134,832. Compounds, which are characterised by substitution in the $\beta$-position, are listed in German Offenlegungsschrift No. 3,028,593 and British Patent Application No. 2,071,685.

However, the synthetic accessibility of the 2,6-diaryl-substituted anthraquinones is very limited, so that in this class of substances, adjustment of the molecules to industrial requirements is only possible to a very imperfect extent.

Overall, the compounds known from the literature prove to be in need of improvement in respect of order parameter, colour density, photochemical stability and/or colour stimulus specification.

The dyestuffs according to the invention provide blue to red tints of excellent light fastness and colour strength. Moreover, they can be employed very well in mixtures to construct black tints.

The dyestuffs which can be employed according to the invention are of particular value for constructing black mixtures for liquid-crystal compositions in combination with anthraquinone and azo dyestuffs. Anthraquinone dyestuffs suitable for combinations of this type are known, for example, from European Offenlegungsschrift No. 26,004, German Offenlegungsschrift No. 3,009,940, German Offenlegungsschrift No. 3,009,974, European Offenlegungsschrift No. 34,832, German Offenlegungsschrift No. 2,903,095, German Offenlegungsschrift No. 3,028,593, German Offenlegungsschrift No. 3,036,853 and German Offenlegungsschrift No. 3,038,372.

The dyestuffs according to the invention are also particularly suitable for colouring synthetic polymers, for example fibres or plastics based on polyester, polyamide, cellulose ester or polycarbonate, by processes customary per se.

EXAMPLE 1

(a) About 35 g of m-cresol is distilled, under water-pump vacuum, from a mixture of 185 g of m-cresol and 15 g of potassium carbonate, 20 g of 1,5-diamino-4,8-di(4-tosylamino)-2,6-dibromoanthraquinone are added to the melt and the mixture is heated at about 160° C., with stirring, until, after about 16 hours, starting material can no longer be detected by thin-layer chromatography. The melt at about 70°–80° C. is diluted with 200 ccm of methanol, the precipitated crystals are filtered off with suction and thoroughly washed with methanol and then with hot water. After drying at 60° C., 18.2 g, corresponding to 84% of theory, of 1,5-diamino-4,8- di(4-tosylamino)-2,6-di(3-methylphenoxy)anthraquinone are obtained.

(b) 10 g of the dyestuff prepared in Example 1a are introduced into 100 ccm of 90 percent sulphuric acid, during which the temperature should not exceed 10° C., and then stirred at 10° C. until, after about 1 hour, the starting material is completely cleaved. The solution obtained is poured onto 200 g of ice, the precipitated dyestuff is filtered off with suction, washed with a little water and thoroughly stirred in 200 ccm of 10 percent ammonia solution at 90° C. After filtering with suction, washing to neutrality and drying at 60° C., 5.9 g, corresponding to 96% of theory, of 1,4,5,8-tetraamino-2,6-di(3-methylphenoxy)anthraquinone, which can be purified by recrystallisation, for example from dimethylformamide, are obtained.

The colour shade of the dyestuff absorbed on silica gel is a blue which, according to the "Colour Index Hue Indication Chart" is assigned the Indicator Number 14.

(c) 0.5% of the dyestuff prepared in Example 1b is dissolved in the nematic phase consisting of a mixture of about 24% of trans-4-heptyl(4-cyanophenyl)cyclohexane, 37% of trans-4-pentyl(4-cyanophenyl)cyclohexane, 26% of trans-4-propyl(4-cyanophenyl)cyclohexane and 12% of trans-4-pentyl(4'-cyanobiphenylyl)cyclohexane. A blue coloured liquid crystal mixture is obtained, in which the dyestuff shows an order parameter S of 0.78.

Similarly good order parameters are also found in other liquid crystal mixtures, for example those listed on pages 15 and 16.

EXAMPLE 2

41.6 g of n-pentyl 3-hydroxybenzoate, 5.2 g of dry potassium carbonate and 18.4 g of 1,5-diamino-4,8-di(4-tosylamino)-2,6-dibromoanthraquinone are introduced into 50 ccm of N-methylpyrrolidone and the mixture is heated with stirring at 120°–130° C. until the starting material has completely reacted. It is then diluted, at about 70° C., with 50 ccm of methanol, allowed to cool down completely and the dyestuff is filtered off with suction, washed with methanol and hot water and dried at 60° C. 21.2 g, corresponding to 85% of theory, of 1,5-diamino-4,8-di-(4-tosylamino)-2,6-di(3-pentyloxycarbonylphenoxy)anthraquinone are obtained.

This intermediate product can also be prepared in analogy to the procedure given in Example 1a in excess n-pentyl 3-hydroxybenzoate without additional solvent.

(b) 10 g of the dyestuff prepared in Example 2a are cleaved in 100 ccm of 90 percent sulphuric acid as in Example 1b. After working up as before, 6.1 g, corresponding to 88%, of 1,4,5,8-tetraamino-2,6-di(3-pentyloxycarbonylphenoxy)anthraquinone are obtained, which can be purified by recrystallisation, for example from chlorobenzene or dimethylformamide. The colour shade of the dyestuff absorbed on silica gel is a blue having the Indicator Number 14 ("Colour Index Hue Indication Chart").

(c) 0.5% of the dyestuff described in Example 2b is dissolved in the liquid-crystalline phase consisting of 51% of 4'-n-pentyl-4-cyanobiphenyl, 25% of 4'-n-heptyl-4-cyanobiphenyl, 16% of 4'-n-octyl-4-cyanobiphenyl and 8% of 4"-n-pentyl-4-cyanoterphenyl. A blue coloured liquid-crystal mixture is obtained in which the dyestuff shows an order parameter S of 0.79.

Similarly good order parameters are also observed when the liquid-crystal mixture used in Example 1c is employed or when other liquid-crystal mixtures are used, for example those listed on pages 15 and 16.

EXAMPLES 3 TO 56

When other m-substituted phenols are used instead of m-cresol or n-pentyl 3-hydroxybenzoate in Example 1a or 2a, then the analogous dyestuffs given in Table 1 are obtained after cleavage in accordance with Example 1b or 2b, which dyestuffs have, in the liquid-crystal mixture indicated in Example 1c, the order parameters S indicated in the table. Adsorbed on silica gel, the colour shades of all the dyestuffs mentioned correspond to a blue having the Indicator Number 14 ("Colour Index Hue Indication Chart").

TABLE 1

| Example | $R_2$ | S |
|---|---|---|
| 3 | Cl | 0.78 |
| 4 | F | 0.79 |
| 5 | Br | 0.77 |
| 6 | $C_2H_5$ | 0.77 |
| 7 | n-$C_3H_7$ | 0.77 |
| 8 | n-$C_4H_9$ | 0.76 |
| 9 | n-$C_5H_{11}$ | 0.75 |
| 10 | t-$C_4H_9$ | 0.76 |
| 11 | n-$C_7H_{15}$ | 0.69 |
| 12 | n-$C_9H_{17}$ | 0.68 |
| 13 | —$OCH_3$ | 0.77 |
| 14 | —$OC_2H_5$ | 0.75 |
| 15 | —O—n-$C_4H_9$ | 0.75 |
| 16 | —O—n-$C_5H_{11}$ | 0.74 |
| 17 | —O—n-$C_6H_{13}$ | 0.75 |
| 18 | —O—n-$C_7H_{15}$ | 0.74 |
| 19 | —O—n-$C_8H_{17}$ | 0.73 |
| 20 | —O—n-$C_{10}H_{21}$ | 0.68 |
| 21 | —S—$CH_3$ | 0.77 |
| 22 | —O—$(CH_2)_2$—OH | 0.72 |
| 23 | cyclohexyl-H | 0.75 |
| 24 | 4-methylcyclohexyl | 0.75 |
| 25 | cyclohexenyl | 0.79 |
| 26 | —OH | 0.73 |
| 27 | —O—CO—$CH_3$ | 0.72 |
| 28 | —O—CO—$C_4H_9$ | 0.73 |
| 29 | —O—CO—phenyl | 0.74 |
| 30 | —O—CO—(4-methylphenyl) | 0.74 |

TABLE 1-continued

| | | |
|---|---|---|
| 31 | —COOCH$_3$ | 0.74 |
| 32 | —COOC$_3$H$_7$ | 0.74 |
| 33 | —COOC$_7$H$_{15}$ | 0.73 |
| 34 | —COOC$_8$H$_{17}$ | 0.71 |
| 35 | —COO—(CH$_2$)$_2$—OCH$_3$ | 0.72 |
| 36 | —COO—(CH$_2$)$_3$—OC$_2$H$_5$ | 0.73 |
| 37 | —CO—NH—(CH$_2$)$_2$—OCH$_3$ | 0.70 |
| 38 | —SO$_2$—O—C$_6$H$_5$ | 0.73 |
| 39 | —SO$_2$—O—C$_6$H$_4$—C$_3$H$_7$ | 0.74 |
| 40 | —SO$_2$—O—C$_6$H$_4$—OC$_4$H$_9$ | 0.74 |
| 41 | —SO$_2$—N(CH$_3$)$_2$ | 0.68 |
| 42 | —SO$_2$—NH—(CH$_2$)$_3$—OCH$_3$ | 0.67 |
| 43 | —CH$_2$—C$_6$H$_5$ | 0.69 |
| 44 | —O—C$_6$H$_5$ | 0.70 |
| 45 | —CF$_3$ | 0.75 |
| 46 | —CN | 0.74 |
| 47 | —S—CO—CH$_3$ | 0.73 |
| 48 | —O—CO—NH—C$_6$H$_5$ | 0.72 |

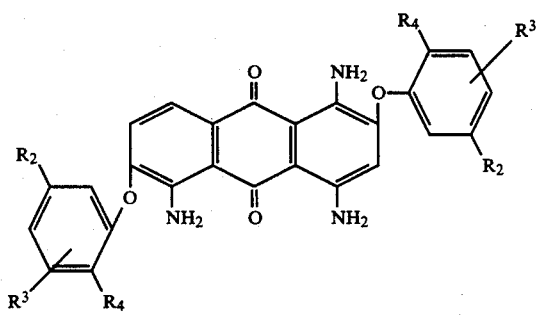

| Example | R$_2$ | R$_3$ | R$_4$ | S |
|---|---|---|---|---|
| 49 | —CH$_3$ | H | CH$_3$ | 0.71 |
| 50 | —CH$_3$ | H | F | 0.71 |
| 51 | —Cl | H | Cl | 0.72 |
| 52 | —Cl | H | OCH$_3$ | 0.70 |
| 53 | —Cl | H | —COOCH$_3$ | 0.67 |
| 54 | —CH$_3$ | —4-CH$_3$ | H | 0.72 |
| 55 | —Cl | —4-Cl | H | 0.71 |
| 56 | —CH$_3$ | —5-CH$_3$ | H | 0.70 |

EXAMPLE 57

(a) About 30 g of phenol is distilled, under water-pump vacuum, from a mixture of 160 g of phenol and 15 g of dry potassium carbonate, and 20 g of 1,8-diamino-4,5-di(4-tosylamino)-2,7-dibromoanthraquinone are added to the distillation residue at about 120° C. The mixture is stirred at 160°–170° C. until, after about 16 hours, the starting material has completely reacted. After cooling down to about 70° C., the mixture is diluted with 200 ccm of methanol, allowed to cool down completely, and the crystals are filtered off with suction and washed with methanol and then with hot water. After drying at 60° C., 17.4 g, corresponding to 84% of theory, of 1,8-diamino-4,5-di(4-tosylamino)-2,7-diphenoxyanthraquinone are obtained.

This intermediate product can also be prepared in analogy to the procedure indicated in Example 2a in a solvent, such as, for example, N-methylpyrrolidone.

(b) 10 g of the dyestuff prepared in Example 57a are dissolved in 100 ccm of 90 percent sulphuric acid at a maximum of 10° C. and then stirred at this temperature until, after about 1 hour, the starting material is completely cleaved. The reaction solution obtained is poured onto 200 g of ice, and the precipitated dyestuff is filtered off with suction, washed with a little water and thoroughly stirred in 200 ccm of 10 percent ammonia solution at 90° C. After filtering with suction, washing to neutrality and drying at 60° C., 5.7 g of 1,4,5,8-tetraamino-2,7-diphenoxyanthraquinone, corresponding to 95% of theory, are obtained, which can be purified by recrystallisation, for example, from dimethylformamide, and which, on silica gel, is a blue with the Indicator Number 14 according to the Colour Index Hue Indication Chart.

(c) 7.5 g of the dyestuff prepared in Example 57a are introduced into 75 g of 100 percent orthophosphoric acid and the mixture is heated at 130° C. until, after about 30 minutes, the starting material is completely cleaved. The reaction solution is cooled down, stirred into 175 ccm of water, and the precipitated dyestuff is filtered off with suction, washed with a little water and stirred moist into about 175 ccm of 2 percent ammonia solution. The suspension is stirred at 90° C. for 30 minutes, filtered hot with suction, washed to neutrality, dried at 60° C. and 5.4 g of 1,4,5,8-tetraamino-2,7-diphenoxyanthraquinone, corresponding to 90% of theory, are obtained; the dyestuff, which is identical to that prepared in Example 57b, can be recrystallised from dimethylformamide for further purification.

(d) 0.5% of the dyestuff prepared in Examples 57b or 57c is dissolved in the nematic phase mentioned in Example 1c. The dyestuff in the blue-coloured liquid-crystal mixture has an order parameter S of 0.78.

Similarly good order parameters are also found in other liquid-crystal mixtures, for example those listed on pages 15 and 16.

EXAMPLE 58

(a) A mixture of 50 ccm of N-methylpyrrolidone, 7.5 g of 1,8-diamino-4,5-di(4-tosylamino)-2,7-dibromoanthraquinone, 11.2 g of m-fluorophenol and 1.0 g of dry potassium carbonate is heated at 140°–150° C. until, after about 15 hours, the starting material has completely reacted. The reaction mixture is diluted, at 60°–70° C., with a mixture of 75 ccm of methanol, 25 ccm of water and 1 ccm of glacial acetic acid, is allowed to cool down completely, and the dyestuff is filtered off with suction, washed with methanol and hot water and dried at 60° C., and 7.1 g of 1,8-diamino-4,5-di(4-tosylamino)-2,6-di(3-fluorophenoxy)anthraquinone, corresponding to 87% of theory, are obtained, which is recrystallised once from dimethylformamide for further purification.

The preparation of this intermediate product can also be carried out without solvent in excess 3-fluorophenol in analogy to the procedure in Example 1a.

(b) 5 g of the dyestuff prepared in Example 58a are introduced into 100 ccm of 90 percent sulphuric acid at a maximum of 10° C. The solution is stirred at room temperature until, after about 1 hour, the starting material has been entirely cleaved (thin-layer chromatogram). The solution obtained is then discharged onto 200 g of ice and the dyestuff suspension is worked up as described before, for example, in Example 57b. The dry dyestuff, 1,4,5,8-tetraamino-2,7-di(3-fluorophenoxy)anthraquinone, weighs 2.7 g, corresponding to a yield of 83% of theory. For complete purification, the dyestuff can be chromatographed over a silica gel column. The colour tint of this dyestuff according to the Colour Index Hue Indication Chart is a blue with the Indicator Number 14.

(c) The dyestuff prepared in Example 58b has an order parameter S of 0.76 in the liquid-crystal mixture mentioned in Example 1c.

Similarly good order parameters are also found in other liquid-crystal mixtures, for example those listed on pages 15 and 16.

EXAMPLES 59 TO 164

When other substituted phenols, instead of phenol or m-fluorophenol, are used in Example 57a or 58a, then, after cleavage according to Example 57b or c or 58b, the analogous dyestuffs given in Table 2 are obtained, and these have, in the liquid-crystal mixture indicated in Example 1c, the order parameters S indicated in the table. The colour shades of the dyestuffs adsorbed on silica gel correspond to a blue with the Indicator Number 14 according to the Colour Index Hue Indication Chart.

TABLE 2

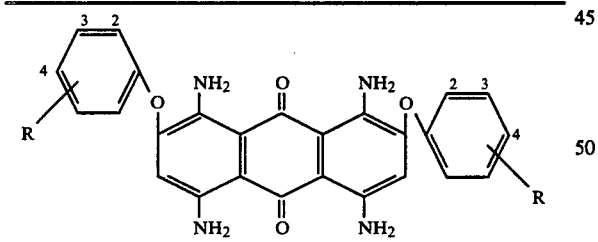

| Example | R | S |
|---|---|---|
| 59 | 2-Cl | 0.77 |
| 60 | 3-Cl | 0.76 |
| 61 | 4-Cl | 0.78 |
| 62 | 4-F | 0.78 |
| 63 | 3-Br | 0.78 |
| 64 | 2-$CH_3$ | 0.78 |
| 65 | 3-$CH_3$ | 0.79 |
| 66 | 4-$CH_3$ | 0.81 |
| 67 | 2-$C_2H_5$ | 0.76 |
| 68 | 3-$C_2H_5$ | 0.77 |
| 69 | 4-$C_2H_5$ | 0.77 |
| 70 | 3-n-$C_3H_7$ | 0.77 |
| 71 | 4-n-$C_3H_7$ | 0.77 |
| 72 | 3-i-$C_3H_7$ | 0.78 |
| 73 | 3-n-$C_4H_9$ | 0.76 |
| 74 | 4-t-$C_4H_9$ | 0.79 |

TABLE 2-continued

| Example | R | S |
|---|---|---|
| 75 | 3-n-$C_5H_{11}$ | 0.77 |
| 76 | 4-n-$C_5H_{11}$ | 0.77 |
| 77 | 3-n-$C_7H_{15}$ | 0.75 |
| 78 | 4-n-$C_7H_{15}$ | 0.75 |
| 79 | 3-n-$C_8H_{17}$ | 0.75 |
| 80 | 4-n-$C_9H_{19}$ | 0.74 |
| 81 | 2-$OCH_3$ | 0.79 |
| 82 | 3-$OCH_3$ | 0.80 |
| 83 | 4-$OCH_3$ | 0.82 |
| 84 | 2-$OC_2H_5$ | 0.76 |
| 85 | 3-$OC_2H_5$ | 0.78 |
| 86 | 4-$OC_2H_5$ | 0.80 |
| 87 | 3-O—n-$C_3H_7$ | 0.79 |
| 88 | 4-O—n-$C_3H_7$ | 0.79 |
| 89 | 3-O—i-$C_3H_7$ | 0.79 |
| 90 | 3-O—n-$C_4H_9$ | 0.78 |
| 91 | 3-O—t-$C_4H_9$ | 0.79 |
| 92 | 4-O—n-$C_4H_9$ | 0.78 |
| 93 | 4-O—t-$C_4H_9$ | 0.79 |
| 94 | 3-O—n-$C_5H_{11}$ | 0.78 |
| 95 | 4-O—n-$C_5H_{11}$ | 0.78 |
| 96 | 3-O—n-$C_6H_{13}$ | 0.77 |
| 97 | 3-O—n-$C_7H_{15}$ | 0.77 |
| 98 | 4-O—n-$C_7H_{15}$ | 0.76 |
| 99 | 3-O—n-$C_8H_{17}$ | 0.74 |
| 100 | 3-O—n-$C_9H_{19}$ | 0.73 |
| 101 | 4-O—n-$C_9H_{19}$ | 0.73 |
| 102 | 3-S—$CH_3$ | 0.78 |
| 103 | 4-S—$CH_3$ | 0.79 |
| 104 | 3-O—$CH_2$—$CH_2$—OH | 0.76 |
| 105 | 4-O—$CH_2$—$CH_2$—OH | 0.75 |
| 106 | 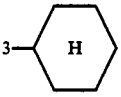 | 0.77 |
| 107 | 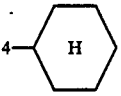 | 0.76 |
| 108 | 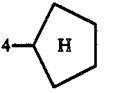 | 0.76 |
| 109 | 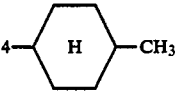 | 0.76 |
| 110 | 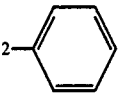 | 0.72 |
| 111 | 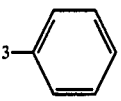 | 0.78 |
| 112 | 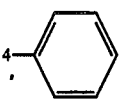 | 0.78 |
| 113 | 3-O—CO—$CH_3$ | 0.78 |
| 114 | 4-O—CO—$CH_3$ | 0.78 |
| 115 | 4-O—CO—$C_4H_9$ | 0.78 |

TABLE 2-continued

| | | |
|---|---|---|
| 116 | 3-O—CO—C₆H₅ (phenyl ester) 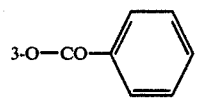 | 0.77 |
| 117 | 4-O—CO—C₆H₄—CH₃ 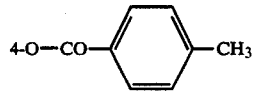 | 0.78 |
| 118 | 3-COOCH₃ | 0.78 |
| 119 | 4-COOCH₃ | 0.78 |
| 120 | 3-COOC₂H₅ | 0.78 |
| 121 | 4-COOC₂H₅ | 0.78 |
| 122 | 3-COOC₃H₇ | 0.77 |
| 123 | 4-COOC₃H₇ | 0.77 |
| 124 | 3-COOC₄H₉ | 0.76 |
| 125 | 4-COOC₄H₉ | 0.76 |
| 126 | 3-COOC₅H₁₁ | 0.77 |
| 127 | 4-COOC₅H₁₁ | 0.77 |
| 128 | 3-COOC₆H₁₃ | 0.75 |
| 129 | 4-COOC₆H₁₃ | 0.75 |
| 130 | 3-COO—(CH₂)₂—OCH₃ | 0.75 |
| 131 | 4-COO—(CH₂)₂—OCH₃ | 0.75 |
| 132 | 3-COO—(CH₂)₂—OC₂H₅ | 0.75 |
| 133 | 4-COO—(CH₂)₂—OC₄H₉ | 0.74 |
| 134 | 3-COO—(CH₂)₃—OCH₃ | 0.74 |
| 135 | 3-CONH—(CH₂)₂—OCH₃ | 0.73 |
| 136 | 3-CO—NH—C₄H₉ | 0.73 |
| 137 | 4-CO—NH—C₆H₅ 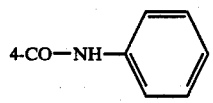 | 0.72 |
| 138 | 4-SO₂—O—C₆H₅ 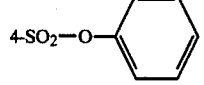 | 0.74 |
| 139 | 4-SO₂—O—C₆H₄—CH₃ 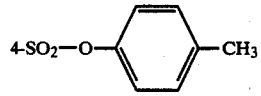 | 0.74 |
| 140 | 4-SO₂—O—C₆H₄—C₃H₇ 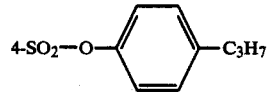 | 0.73 |
| 141 | 4-SO₂—O—C₆H₄(OCH₃) 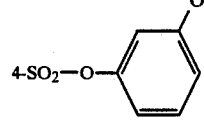 | 0.74 |
| 142 | 4-SO₂—O—C₆H₄—OC₄H₉ 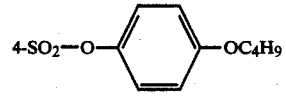 | 0.74 |
| 143 | 3-SO₂—O—C₆H₅ 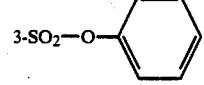 | 0.73 |
| 144 | 4-SO₂—N(CH₃)₂ | 0.72 |
| 145 | 4-SO₂—NH—(CH₂)₃—OC₂H₅ | 0.70 |
| 146 | 3-CH₂—C₆H₅ 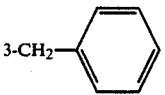 | 0.75 |
| 147 | 4-CH₂—C₆H₅ 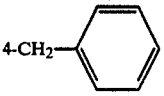 | 0.75 |
| 148 | 3-O—C₆H₅ 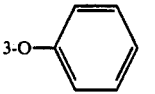 | 0.75 |
| 149 | 4-O—C₆H₅ 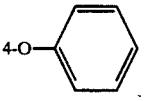 | 0.75 |
| 150 | 3-CF₃ | 0.77 |
| 151 | 4-CF₃ | 0.77 |
| 152 | 3-CN | 0.78 |
| 153 | 4-S—CO—CH₃ | 0.76 |
| 154 | 3-O—CO—NH—C₆H₅ 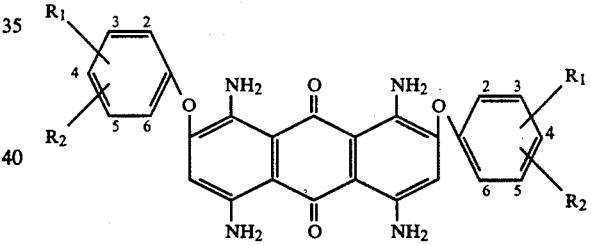 | 0.75 |
| 155 | 4-O—CO—NH—C₄H₉ | 0.74 |
| 156 | 4-NH—CO—CH₃ | 0.76 |
| 157 | 3-NH—CO—C₄H₉ | 0.76 |

| Example | R₁ | R₂ | S |
|---|---|---|---|
| 158 | 3-Cl | 4-Cl | 0.76 |
| 159 | 2-Cl | 5-Cl | 0.75 |
| 160 | 3-CH₃ | 4-CH₃ | 0.75 |
| 161 | 3-F | 4-CH₃ | 0.74 |
| 162 | 2-CH₃ | 5-Cl | 0.73 |
| 163 | 3-CH₃ | 4-Cl | 0.73 |
| 164 | 3-(CH₂)₄—4 | | 0.70 |

EXAMPLE 165

(a) 9.5 g of 1,8-diamino-4,5-di(4-tosylamino)-2,7-diphenoxyanthraquinone, preparation see Example 57a, 22.6 g of ε-caprolactam, 15 g of n-butanol and 2.6 g of dry potassium carbonate are heated at 140° to 145° C., with stirring, until the material employed has completely reacted. During this, a gentle stream of nitrogen is passed over the reaction mixture. After completion of reaction, the reaction mixture at about 70° C. is diluted with 50 ccm of methanol, allowed to cool down completely, and the crystals are filtered off with suction and washed with methanol and hot water. After drying, 7.6 g of 1,8-diamino-4,5-di(4-tosylamino)-2,7-di-n-butoxyanthraquinone, corresponding to 84% of theory, are obtained.

(b) 5 g of the dyestuff prepared in Example 165 a are stirred in 50 ccm of 90 percent sulphuric acid at a maximum of 10° C. until, after about 1 hour, the starting material is completely cleaved. The reaction solution is poured onto 100 g of ice, and the precipitated dyestuff is filtered off with suction, washed with water, stirred thoroughly with 100 ccm of 10 percent ammonia solution at 90° C. and filtered off with suction. It is then washed to neutrality, dried at 60° C. and 2.5 g, corresponding to 87% of theory, of 1,4,5,8-tetraamino-2,7-di-n-butoxyanthraquinone are obtained, the colour tint on silica gel being a blue with the Indicator Number 14 according to the Colour Index Hue Indication Chart.

(c) In the liquid-crystal mixture mentioned in Example 1c, the dyestuff prepared in Example 165b has an order parameter S of 0.75.

Similarly good order parameters are also found in other liquid-crystal mixtures, for example those listed on pages 15 and 16.

EXAMPLES 166–189

When other (subst.) alcohols are used instead of n-butanol in Example 165a, then, after cleavage according to Example 165b, the analogous dyestuffs indicated in Table 3 are obtained, which, in the liquid-crystal mixture indicated in Example 1c, have the order parameters S indicated in the table and their colour shade on silica gel is a blue between the Indicator Numbers 14 and 15 according to the Colour Index Hue Indication Chart.

TABLE 3

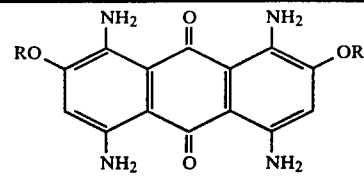

| Example | R | S |
|---|---|---|
| 166 | —n-$C_3H_7$ | 0.74 |
| 167 | —n-$C_5H_{11}$ | 0.74 |
| 168 | —n-$C_6H_{13}$ | 0.73 |
| 169 | —n-$C_7H_{15}$ | 0.70 |
| 170 | —$(CH_2)_3$—CN | 0.69 |
| 171 | —$(CH_2)_3$—$COOCH_3$ | 0.72 |
| 172 | —$(CH_2)_3$—$COOC_5H_{11}$ | 0.73 |
| 173 | —$(CH_2)_2$—$OCH_3$ | 0.71 |
| 174 | —$(CH_2)_2$—$OC_2H_5$ | 0.71 |
| 175 | —$(CH_2)_2$—$OC_4H_9$ | 0.70 |
| 176 | —$(CH_2)_3$—$OCH_3$ | 0.70 |
| 177 | —$(CH_2)_3$—$OC_4H_9$ | 0.69 |
| 178 | —$(CH_2)_2$—C$_6$H$_5$ | 0.75 |
| 179 | —$(CH_2)_3$—C$_6$H$_5$ | 0.75 |
| 180 | —$(CH_2)_2$—O—C$_6$H$_5$ | 0.74 |

TABLE 3-continued

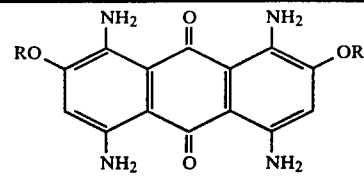

| Example | R | S |
|---|---|---|
| 181 | —$(CH_2)_2$—O—$CH_2$—C$_6$H$_5$ | 0.74 |
| 182 | —$(CH_2)_3$—O—$CH_2$—C$_6$H$_4$—$CH_3$ | 0.73 |
| 183 | —$(CH_2)_4$—O—$CH_2$—C$_6$H$_5$ | 0.70 |
| 184 | —$(CH_2)_5$—O—$CH_2$—C$_6$H$_5$ | 0.69 |
| 185 | —$(CH_2)_6$—O—$CH_2$—C$_6$H$_4$—$CH_3$ | 0.71 |
| 186 | —$(CH_2)_4$—O—$CH_2$—CH=$CH_2$ | 0.70 |
| 187 | —$CH_2$—C$_6$H$_5$ | 0.73 |
| 189 | —$CH_2$—C$_6$H$_4$—$CH_3$ | 0.74 |
| 189 | —$CH_2$—C$_6$H$_4$—$OCH_3$ | 0.74 |

EXAMPLE 190

(a) About 30 g of phenol are distilled out in vacuo from a mixture of 160 g of phenol and 15 g of dry potassium carbonate, and 20 g of 1,5-diamino-4,8-di(4-tosylamino)-2,6-dibromoanthraquinone are added to the remaining melt at about 120° C. The mixture is then stirred at 160° C. until, after about 4 hours, the starting material has almost completely disappeared and a mixture has resulted consisting of the somewhat more red monoreaction product with only a little of the much more red bisreaction product (chromatography on silica gel, mobile phase: 50 ccm of toluene+1 ccm of methanol). The mixture is then allowed to cool down to about 70° C. diluted with 200 ccm of methanol, allowed to cool completely and filtered with suction. The product obtained is washed with methanol and then with water and, after drying at 60° C., 6.1 g, corresponding to 30% of theory, of 1,5-diamino-4,8-di(4-tosylamino)-2-phenoxy-6-bromoanthraquinone are obtained, which can be isolated almost completely pure by recrystallisation from chlorobenzene. A second crystal fraction crystallises out of the above mother liquor after standing for some time, and this is filtered off with suction, washed and dried (4.1 g) and proves to be mainly the double reaction product, 1,5-diamino-4,8-di(4-tosylamino)-2,6-diphenoxyanthraquinone.

(b) 2 g of the dyestuff prepared in Example 190a are introduced into 50 ccm of concentrated sulphuric acid at a maximum of 10° C. and the solution produced is stirred at a maximum of 10° C. until, after about 1 hour, the dyestuff employed is entirely cleaved.

The reaction mixture is then poured onto 100 g of ice, and the precipitated dyestuff is filtered off with suction, washed with water and the moist product is introduced into 100 ccm of 10 percent ammonia solution. After stirring at 90° C. for 1 hour, the dyestuff is filtered off with suction, washed with water to neutrality and dried at 60° C. 1 g, corresponding to 85% of theory, of 1,4,5,8-tetraamino-2-phenoxy-6-bromoanthraquinone is obtained, the colour tint on silica gel of which is a blue with the Indicator Number 15 according to the Colour Index Hue Indication Chart.

(c) The dyestuff prepared in Example 190b has, in the liquid-crystal mixture mentioned in Example 1c, an order parameter S of 0.76.

Similarly good order parameters are also found in other liquid-crystal mixtures, for example, those listed on pages 15 and 16.

EXAMPLES 191 TO 292

When other substituted phenols are employed instead of phenol in Example 190a, then, after cleavage according to Example 190b, the analogous dyestuffs indicated in Table 4 are obtained, which dyestuffs, in the liquid-crystal mixture indicated in Example 1c, have the order parameters S indicated in the table and the colour tints of which on silica gel are a blue between the Indicator Numbers 14 and 15 according to the Colour Index Hue Indication Chart.

TABLE 4

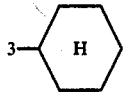

| Example | R | S |
|---|---|---|
| 191 | 2-Cl | 0.77 |
| 192 | 3-Cl | 0.78 |
| 193 | 4-Cl | 0.78 |
| 194 | 4-F | 0.78 |
| 195 | 3-F | 0.78 |
| 196 | 3-Br | 0.77 |
| 197 | 2-$CH_3$ | 0.78 |
| 198 | 3-$CH_3$ | 0.78 |
| 199 | 4-$CH_3$ | 0.80 |
| 200 | 2-$C_2H_5$ | 0.76 |
| 201 | 3-$C_2H_5$ | 0.77 |
| 202 | 4-$C_2H_5$ | 0.78 |
| 203 | 3-n-$C_3H_7$ | 0.77 |
| 204 | 3-i-$C_3H_7$ | 0.78 |
| 205 | 4-n-$C_3H_7$ | 0.77 |

TABLE 4-continued

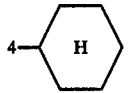

| Example | R | S |
|---|---|---|
| 206 | 3-n-$C_4H_9$ | 0.77 |
| 207 | 4-t-$C_4H_9$ | 0.78 |
| 208 | 3-n-$C_5H_{11}$ | 0.76 |
| 209 | 4-n-$C_5H_{11}$ | 0.76 |
| 210 | 3-n-$C_7H_{15}$ | 0.74 |
| 211 | 4-n-$C_7H_{15}$ | 0.76 |
| 212 | 3-n-$C_8H_{17}$ | 0.75 |
| 213 | 4-n-$C_9H_{19}$ | 0.74 |
| 214 | 2-$OCH_3$ | 0.79 |
| 215 | 3-$OCH_3$ | 0.80 |
| 216 | 4-$OCH_3$ | 0.79 |
| 217 | 2-$OC_2H_5$ | 0.77 |
| 218 | 3-$OC_2H_5$ | 0.78 |
| 219 | 4-$OC_2H_5$ | 0.79 |
| 220 | 3-O—n-$C_3H_7$ | 0.78 |
| 221 | 4-O—n-$C_3H_7$ | 0.78 |
| 222 | 3-O—1-$C_3H_7$ | 0.78 |
| 223 | 3-O—n-$C_4H_9$ | 0.78 |
| 224 | 3-O—t-$C_4H_9$ | 0.77 |
| 225 | 4-O—n-$C_4H_9$ | 0.76 |
| 226 | 4-O—t-$C_4H_9$ | 0.79 |
| 227 | 3-O—n-$C_5H_{11}$ | 0.78 |
| 228 | 4-O—t-$C_5H_{11}$ | 0.77 |
| 229 | 3-O—n-$C_6H_{13}$ | 0.78 |
| 230 | 3-O—n-$C_7H_{15}$ | 0.78 |
| 231 | 4-O—n-$C_7H_{15}$ | 0.77 |
| 232 | 3-O—n-$C_8H_{17}$ | 0.75 |
| 233 | 3-O—n-$C_9H_{19}$ | 0.74 |
| 234 | 4-O—t-$C_9H_{19}$ | 0.74 |
| 235 | 3-S—$CH_3$ | 0.78 |
| 236 | 4-S—$CH_3$ | 0.78 |
| 237 | 3-O—$CH_2$—$CH_2$—OH | 0.76 |
| 238 | 4-O—$CH_2$—$CH_2$—OH | 0.76 |
| 239 | 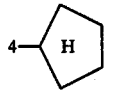 | 0.78 |
| 240 | 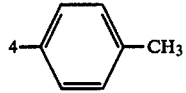 | 0.77 |
| 241 | 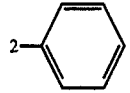 | 0.76 |
| 242 | 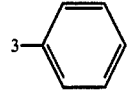 | 0.75 |
| 243 | (2-phenyl) | 0.71 |
| 244 | (3-phenyl) | 0.79 |

TABLE 4-continued

Structure: 1,8-diamino-5-amino-4-amino-6-bromo-2-(R-phenoxy)anthraquinone

| Example | R | S |
|---|---|---|
| 245 | 4-phenyl | 0.80 |
| 246 | 3-O—CO—CH₃ | 0.78 |
| 247 | 4-O—CO—CH₃ | 0.78 |
| 248 | 4-O—CO—C₄H₉ | 0.78 |
| 249 | 3-O—CO—phenyl | 0.78 |
| 250 | 4-O—CO—(4-CH₃-phenyl) | 0.77 |
| 251 | 3-COO—CH₃ | 0.78 |
| 252 | 4-COO—CH₃ | 0.78 |
| 253 | 3-COOC₂H₅ | 0.77 |
| 254 | 4-COOC₂H₅ | 0.77 |
| 255 | 3-COOC₃H₇ | 0.76 |
| 256 | 4-COOC₃H₇ | 0.77 |
| 257 | 3-COOC₄H₉ | 0.76 |
| 258 | 4-COOC₄H₉ | 0.78 |
| 259 | 3-COOC₅H₁₁ | 0.78 |
| 260 | 4-COOC₅H₁₁ | 0.78 |
| 261 | 3-COOC₆H₁₃ | 0.75 |
| 262 | 4-COOC₆H₁₃ | 0.77 |
| 263 | 3-COO—(CH₂)₂—OCH₃ | 0.75 |
| 264 | 4-COO—(CH₂)₂—OCH₃ | 0.76 |
| 265 | 3-COO—(CH₂)₂—OC₂H₅ | 0.74 |
| 266 | 4-COO—(CH₂)₂—OC₄H₉ | 0.74 |
| 267 | 3-COO—(CH₂)₃—OC₂H₅ | 0.73 |
| 268 | 3-CO—NH—(CH₂)₂—OCH₃ | 0.72 |
| 269 | 3-CO—NH—C₄H₉ | 0.72 |
| 270 | 4-CO—NH—phenyl | 0.71 |
| 271 | 4-SO₂—O—phenyl | 0.73 |
| 272 | 4-SO₂—O—(4-CH₃-phenyl) | 0.73 |
| 273 | 4-SO₂—O—(4-C₃H₇-phenyl) | 0.73 |
| 274 | 4-SO₂—O—(4-OCH₃-phenyl) | 0.72 |
| 275 | 4-SO₂—O—(4-OC₄H₉-phenyl) | 0.71 |
| 276 | 3-SO₂—O—phenyl | 0.74 |
| 277 | 4-SO₂—N(CH₃)₂ | 0.73 |
| 278 | 4-SO₂—NH—(CH₂)₃—OC₂H₅ | 0.69 |
| 279 | 3-CH₂—phenyl | 0.75 |
| 280 | 4-CH₂—phenyl | 0.75 |
| 281 | 3-O—phenyl | 0.74 |
| 282 | 4-O—phenyl | 0.75 |
| 283 | 3-CF₃ | 0.77 |
| 284 | 4-CF₃ | 0.77 |
| 285 | 3-CN | 0.78 |
| 286 | 4-S—CO—CH₃ | 0.77 |
| 287 | 3-O—CO—NH—phenyl | 0.76 |
| 288 | 4-O—CO—NH—C₄H₉ | 0.75 |
| 289 | 4-NH—CO—CH₃ | 0.75 |
| 290 | 3-NH—CO—C₄H₉ | 0.75 |
| 291 | 3,4-Di-Cl | 0.76 |
| 292 | 2,4-Di-CH₃ | 0.75 |

EXAMPLE 293

(a) A mixture of 15 g of n-butanol, 22.6 g of ε-caprolactam, 18.7 g, of 1,5-diamino-4,8-di(4-tosylamino)-2-phenoxy-6-bromoanthrquainone (preparation see Example 190a) and 2.6 g of dry potassium carbonate are heated at 120° to 130° C. until the starting material has reacted, and during this a slow stream of nitrogen is passed through the apparatus. The reaction mixture at about 70° C. is then diluted with 50 ccm of methanol and, after completely cooling down, the dyestuff is filtered off with suction, washed with methanol and hot water and dried at 60° C. 14.7 g of 1,5-diamino-4,8-di(4-tosylamino)-2-butoxy-6-bromoanthraquinone, corresponding to 80% of theory, are obtained.

(b) 2 g of the intermediate product prepared in Example 293a are introduced, at a maximum of 10° C., into 50 ccm of 90 percent sulphuric acid and stirred at this temperature until cleavage is complete. The reaction mixture is then discharged onto 200 g of ice, the precipitated dyestuff is filtered off with suction, washed with a little water and the moist paste is introduced into 200 ccm of 10 percent ammonia solution. The dyestuff suspension is stirred at 90° C. for 30 minutes, then filtered hot with suction, washed to neutrality and dried at 60° C. 1 g of 1,4,5,8-tetraamino-2-butoxy-6-bromoanthraquinone, corresponding to 86% of theory, is obtained, the colour shade of which on silica gel is a blue with the Indicator Number 15 according to the Colour Index Hue Indication Chart.

(c) The dyestuff prepared in Example 293b has, in the liquid-crystal mixture mentioned in Example 1c, an order parameter S of 0.74. Similarly good order parameters are also found in other liquid-crystal mixtures, for example those listed on pages 15 and 16.

EXAMPLES 294 TO 302

When other (substituted) alcohols are used, instead of n-butanol, in Example 293a, then, after cleavage according to Example 293b, the analogous dyestuffs indicated in Table 5 are obtained, which, in the liquid-crystal mixture indicated in Example 1c, have the order parameters S indicated in the table and the colour shades of which on silica gel are a blue between the Indicator Numbers 14 and 15 according to the Colour Index Hue Indication Chart.

TABLE 5

[Structure: anthraquinone with $NH_2$ groups at 1,4,5,8 positions, Br at 6, OR at 2]

| Example | R | S |
|---|---|---|
| 294 | —$CH_3$ | 0.74 |
| 295 | —$C_2H_5$ | 0.71 |
| 296 | —n-$C_3H_7$ | 0.73 |
| 297 | —$(CH_2)_2$—$OCH_3$ | 0.71 |
| 298 | —$(CH_2)_2$—C$_6$H$_5$ | 0.74 |
| 299 | —$(CH_2)_4$—O—C$_6$H$_5$ | 0.73 |
| 300 | —$CH_2$—C$_6$H$_5$ | 0.73 |
| 301 | —$CH_2$—C$_6$H$_4$—$OCH_3$ | 0.73 |
| 302 | —$(CH_2)_3$—CN | 0.71 |

EXAMPLE 303

(a) About 30 g of phenol is distilled out in vacuo from a mixture of 160 g of phenol and 15 g of dry potassium carbonate, and 20 g of 1,8-diamino-4,5-di(4-tosylamino)-2,7-dibromoanthraquinone are added to the remaining melt at about 120° C. The mixture is heated until, after about 4 hours, the starting material has almost completely reacted and a mixture has been produced which consists mainly of the somewhat more red monoreaction product and small amounts of the even more red direaction product (chromatography on silica gel with a mobile phase consisting of 50 ccm of toluene and 1 ccm of methanol). The reaction mixture at about 70° C. is diluted with 200 ccm of methanol, and after cooling down completely, the crystals are filtered off with suction and washed with methanol and hot water, and after drying at 60° C., 6.3 g, corresponding to 30% of theory, of 1,8-diamino-4,5-di(4-tosylamino)-2-phenoxy-7-bromoanthraquinone are obtained, which can be obtained in almost completely pure form by recrystallisation from chlorobenzene. After standing for some time, a further 4.3 g of a mixture of substances crystallises out from the mother liquor which has been diluted with wash methanol, but this mixture consists predominantly of the direction product.

(b) 6 g of the intermediate product prepared in Example 303a are introduced into 150 ccm of concentrated sulphuric acid at a maximum of 10° C. and stirred at this temperature until, after about 1 hour, the starting material is completely cleaved. The solution is then poured onto 300 g of ice, the precipitated product is filtered off with suction, washed with water and the paste is introduced into 300 ccm of 10 percent ammonia solution. The dyestuff suspension obtained is stirred at 90° C. for 30 min., filtered hot with suction and the dyestuff obtained is washed to neutrality and dried at 60° C. 3.1 g of 1,4,5,8-tetraamino-2-phenoxy-7-bromoanthraquinone, corresponding to 87% yield, are obtained, the colour tint of which on silica gel is a blue with the Indicator Number 15 according to the Colour Index Hue Indication Chart.

(c) The dyestuff prepared in Example 303b has, in the liquid-crystal mixture mentioned in Example 1c, an order parameter S of 0.73. Similarly good order parameters are also found in other liquid-crystal mixtures, for example those listed on pages 15 and 16.

EXAMPLE 304

(a) 15 g of 1,8-diamino-4,5-di(4-tosylamino)-2,7-dibromoanthraquinone, 11.2 g of 3-fluorophenol and 2 g of dry potassium carbonate are introduced into 100 ccm of N-methylpyrrolidone and the mixture is heated with stirring at 110° C. until, after about 4 hours, the starting material has almost completely reacted (compare Example 303a). The reaction mixture is worked up as described in Example 303a and 7.2 g of 1,8-diamino-4,5-di(4-tosylamino)-2-(3-fluorophenoxy)-7-bromoanthraquinone, corresponding to 46% of theory, are obtained.

(b) 7 g of the intermediate product prepared in Example 304a are introduced into 200 ccm of 90 percent sulphuric acid at a maximum of 10° C., and the solution produced is stirred at this temperature until, after about 1 hour, the material employed is completely cleaved. It is then poured onto 800 g of ice, and the product is filtered off with suction and washed with a little water. The product is sucked dry and then introduced into 200 ccm of 10 percent ammonia solution, stirred at 90° C. for 30 minutes, filtered off with suction, washed to neutrality and dried at 60° C. 3.6 g, corresponding to 86% of theory, of 1,4,5,8-tetraamino-2-(3-fluorophenoxy)-7-bromoanthraquinone are obtained. The colour tint on silica gel is a blue between the Indicator Numbers 14 and 15 according to the Colour Index Hue Indication Chart.

(c) The dyestuff prepared in Example 304b has, in the liquid-crystal mixture mentioned in Example 1c, an order parameter S of 0.76. Similarly good order parameters are also found in other liquid-crystal mixtures, for example those listed on pages 15 and 16.

EXAMPLE 305

(a) A mixture of 80 ccm of N-methylpyrrolidone, 41.6 g of n-pentyl 4-hydroxybenzoate, 2.8 g of dry potassium carbonate and 14.8 g of 1,8-diamino-4,5-di(4-tosylamino)-2,7-dibromoanthraquinone is heated at 150° C. until, after about 15 to 30 min., the starting material has completely reacted (compare Example 303a). The mixture at about 70° C. is then diluted with 150 ccm of methanol and allowed to cool down completely. The precipitated crystals are filtered off with suction, washed with methanol and hot water and dried at 60° C. 4.4 g of 1,8-diamino-4,5-di(4-tosylamino)-2-(4-n-pentyloxycarbonylphenoxy)-7-bromoanthraquinone are obtained, corresponding to a yield of 25% of theory.

(b) 4 g of the dyestuff prepared in Example 305a are introduced into 100 ccm of 90 percent sulphuric acid at a maximum of 10° C. and stirred at this temperature until, after about 1 hour, complete cleavage of the starting material is observed. The solution is then poured onto 400 g of ice, and the dyestuff is filtered off with suction, washed with a little water and introduced into 400 ccm of 10 percent ammonia solution. The suspension is heated at 90° C. for 30 min., and the dyestuff is filtered off with suction, washed to neutrality and dried at 60° C. 2.1 g of 1,4,5,8-tetraamino-2-(4-n-pentyloxycarbonylphenoxy)-7-bromoanthraquinone, corresponding to 81% of theory, are obtained. The colour tint on silica gel is a blue with the Indicator Number 15 according to the Colour Index Hue Indication Chart.

(c) The dyestuff prepared in Example 305b has, in the liquid-crystal mixture mentioned in Example 1c, an order parameter S of 0.78. Similarly good order parameters are also found in other liquid-crystal mixtures, for example those mentioned on pages 15 and 16.

EXAMPLES 306 TO 337

When other substituted phenols are used in Examples 303a to 305a instead of the phenols mentioned there, then, after cleavage according to Examples 303b to 305b, the analogous dyestuffs indicated in Table 6 are obtained, which, in the liquid-crystal mixture mentioned in Example 1c, have the order parameters S indicated in the Table 6, and the colour tints of which on silica gel are a blue between the Indicator Numbers 14 and 15 according to the Colour Index Hue Indication Chart.

TABLE 6

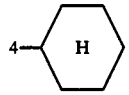

| Example | R | S |
|---|---|---|
| 306 | 2-Cl | 0.76 |
| 307 | 3-Cl | 0.78 |
| 308 | 4-Cl | 0.77 |
| 309 | 3-CH$_3$ | 0.78 |
| 310 | 4-CH$_3$ | 0.79 |
| 311 | 4-C$_2$H$_5$ | 0.78 |
| 312 | 2-OCH$_3$ | 0.78 |
| 313 | 4-OCH$_3$ | 0.79 |
| 314 | 3-SCH$_3$ | 0.76 |
| 315 | 4-SCH$_3$ | 0.77 |
| 316 | 4—⌬—H | 0.76 |
| 317 | 3—⌬ | 0.80 |
| 318 | 4—⌬ | 0.79 |
| 319 | 4-COOCH$_3$ | 0.77 |
| 320 | 3-COOC$_2$H$_5$ | 0.77 |
| 321 | 4-COOC$_2$H$_5$ | 0.77 |
| 322 | 4-COOC$_3$H$_7$ | 0.76 |
| 323 | 4-COOC$_3$H$_7$ | 0.77 |
| 324 | 3-COOC$_4$H$_9$ | 0.76 |
| 325 | 4-COOC$_4$H$_9$ | 0.78 |
| 326 | 3-COOC$_5$H$_{11}$ | 0.78 |
| 327 | 3-COOC$_7$H$_{13}$ | 0.78 |
| 328 | 4-COOC$_7$H$_{13}$ | 0.75 |
| 329 | 4-SO$_2$—O—⌬ | 0.72 |
| 330 | 3-CF$_3$ | 0.76 |
| 331 | 4-CF$_3$ | 0.76 |
| 332 | 3-OCF$_3$ | 0.77 |
| 333 | 3-CN | 0.78 |
| 334 | 2,4-di-Cl | 0.76 |
| 335 | 3,4-di-Cl | 0.75 |
| 336 | 3,4-di-CH$_3$ | 0.76 |

TABLE 6-continued

NH₂ O NH₂
Br — [anthraquinone core] — O — [phenyl]—R
NH₂ O NH₂

| Example | R | S |
|---------|-----------|------|
| 337 | 2,5-di-CH₃ | 0.74 |

EXAMPLE 338

(a) A mixture of 7.4 g of n-butanol, 11.3 g of ε-caprolactam, 9.4 g of 1,8-diamino-4,5-di(4-tosylamino)-2-phenoxy-7-bromoanthraquinone (preparation see Example 303a) and 1.3 g of dry potassium carbonate is heated at 135° to 140° C., with stirring and passing nitrogen over, until the starting material has reacted. The reaction mixture at about 70° C. is then diluted with 25 ccm of methanol, allowed to cool down completely and the precipitate crystals are filtered off with suction. The dyestuff is washed with methanol and hot water and dried at about 60° C. The yield of 1,8-diamino-4,5-di(4-tosylamino)-2-n-butoxy-7-bromoanthraquinone is 7.1 g, corresponding to 77% of theory.

(b) 6 g of the intermediate product prepared in Example 338a are introduced into 150 ccm of concentrated sulphuric acid at a maximum of 10° C. and stirred at this temperature until, after about 1 hour, the starting material is completely cleaved. The solution is then poured onto 300 g of ice, the precipitated product is filtered off with suction, washed with water and the moist paste obtained is introduced into about 300 ccm of 10 percent ammonia solution. The dyestuff suspension obtained is stirred at 90° C. for 30 min., and the dyestuff obtained is filtered off hot with suction, washed to neutrality and dried at 60° C. 3.1 g of 1,4,5,8-tetraamino-2-n-butoxy-7-bromoanthraquinone, corresponding to 89% of theory, are obtained. On silica gel, the dyestuff shows a blue tint of Indicator Number 14 (Colour Index Hue Indication Chart).

(c) The dyestuff prepared in Example 338b has, in the liquid-crystal mixture mentioned in Example 1c, an order parameter S of 0.75.

Similarly good order parameters are also found in other liquid-crystal mixtures, for example those mentioned on pages 15 and 16.

EXAMPLES 339 TO 347

When other (substituted) alcohols are used in Example 338a instead of the n-butanol mentioned there, then, after cleavage according to Example 338b, the analogous dyestuffs mentioned in Table 7 are obtained, which, in the liquid-crystal mixture mentioned in Example 1c, have the order parameters S indicated in Table 7 and the colour tints of which on silica gel are a blue between the Indicator Numbers 14 and 15 acording to the Colour Index Hue Indication Chart.

TABLE 7

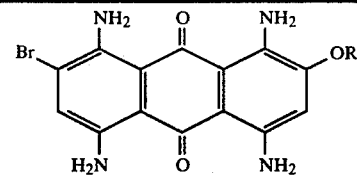

| Example | R | S |
|---------|--------------------|------|
| 339 | —CH₃ | 0.73 |
| 340 | —C₂H₅ | 0.72 |
| 341 | n-C₃H₇ | 0.74 |
| 342 | —n-C₅H₁₁ | 0.75 |
| 343 | —(CH₂)₂—OCH₃ | 0.72 |
| 344 | —(CH₂)₂—[phenyl] | 0.75 |
| 345 | —(CH₂)₂—O—[phenyl] | 0.74 |
| 346 | —(CH₂)₂—O—CH₂—[phenyl] | 0.73 |
| 347 | —CH₂—[phenyl] | 0.73 |

EXAMPLE 348

(a) 42.8 g of 1,5-diamino-4,8-dihydroxy-2,6-dibromoanthraquinone, obtained by tetrabromination of 1,5-diaminoanthraquinone and subsequent reaction with boric acid/sulphuric acid, and 20.8 g of dry potassium carbonate are introduced into a mixture of 86.4 g of m-cresol and 100 ccm of N-methylpyrrolidone, and this is heated at 120°–130° C. until reaction is complete. The mixture at about 70° C. is then diluted with 100 ccm of methanol, and after cooling down completely, is filtered off with suction, washed with methanol and hot water and dried at 60° C. 41 g, corresponding to 85% of theory, of 1,5-diamino-4,8-dihydroxy-2,6-di(3-methylphenoxy)-anthraquinone are thus obtained, which can be purified by recrystallisation, for example from dimethylformamide. The colour shade of the dyestuff adsorbed on silica gel is a blue to which the Indicator Number 14 according to the Colour Index Hue Indication is assigned.

(b) The dyestuff prepared in Example 348a has, in the liquid-crystal mixture mentioned in Example 1c, an order parameter S of 0.70. Similarly good order parameters are also found in other liquid-crystal mixtures, for example those mentioned on pages 15 and 16.

EXAMPLE 349

(a) 39.5 g, corresponding to 81% of theory, of 1,5-diamino-4,8-dihydroxy-3,7-di(3-methylphenoxy)anthraquinone are obtained exactly corresponding to the description of Example 348a from 42.8 g of 1,5-diamino-4,8-dihydroxy-3,7-dibromoanthraquinone, obtained by bromination of 1,5-dinitro-4,8-dihydroxyanthraquinone and subsequent reduction of the nitro groups or by tosylamide fusion of 1,5-dihydroxy-2,4,6,8-tetrabromoanthraquinone and subsequent cleavage of the tosyl radicals, or by bromination of 1,5-diamino-4,8-dihydroxyanthraquinone in oleum in analogy to German Auslegeschrift No. 1,184,879, and 86.4 g of m-cresol. The colour shade of the dyestuff adsorbed on silica gel is a blue of Indicator Number 14 (Colour Index Hue Indication Chart).

(b) The dyestuff prepared in Example 349a has, in the liquid-crystal mixture mentioned in Example 1c, an order parameter S of 0.71. The order parameter is also similarly good in other liquid-crystal mixtures, for example those mentioned on pages 15 and 16.

EXAMPLE 350

(a) 40.2 g, corresponding to 88% of theory, of 1,8-diamino-4,5-dihydroxy-2,7-diphenoxyanthraquinone is obtained exactly corresponding to the description in Example 348a from 42.8 g of 1,8-diamino-4,5-dihydroxy-2,7-dibromoanthraquinone, obtained by tetrabromination of 1,8-diaminoanthraquinone and subsequent reaction with boric acid/sulphuric acid, and 75.2 g of phenol, which dyestuff, adsorbed on silica gel, is a blue with the Indicator Number 14 (Colour Index Hue Indication Chart).

(b) The dyestuff prepared in Example 350a has, in the liquid-crystal mixture mentioned in Example 1c, an order parameter S of 0.70. The order parameter is also similarly good in other liquid-crystal mixtures, for example those mentioned on pages 15 and 16.

EXAMPLE 351

(a) 39 g, corresponding to 85% of theory, of 1,8-diamino-4,5-dihydroxy-3,6-diphenoxyanthraquinone are obtained exactly corresponding to the description in Example 348a from 42.8 g of 1,8-diamino-4,5-dihydroxy-3,6-dibromoanthraquinone, obtained by bromination of 1,8-dinitro-4,5-dihydroxyanthraquinone and subsequent reduction of the nitro groups or by tosylamide fusion of 1,8-dihydroxy-2,4,5,7-tetrabromoanthraquinone and subsequent splitting off of the tosyl radicals, or by bromination of 1,8-diamino-4,5-dihydroxyanthraquinone in oleum in analogy to German Auslegeschrift No. 1,184,879, and and 75.2 g of phenol, which dyestuff, adsorbed on silica gel, is a blue with the Indicator Number 14 (Colour Index Hue Indication Chart).

(b) The dyestuff prepared in Example 351a has, in the liquid-crystal mixture mentioned in Example 1c, an order parameter S of 0.72. The order parameter is also similarly good in other liquid-crystal mixtures, for example those mentioned on pages 15 and 16.

EXAMPLES 352 TO 400

When other substituted phenols are used in Examples 348a, 349a, 350a or 351a instead of the m-cresol or phenol mentioned there, then the analogous dyestuffs mentioned in Table 8 are obtained, which, in the liquid-crystal mixture mentioned in Example 1c, have the order parameter S mentioned in Table 8 and the colour tints of which on silica gel are a blue between the Indicator Numbers 14 and 15 according to the Colour Index Hue Indication Chart.

TABLE 8

| Example | Type | R | S |
|---|---|---|---|
| 352 | 1 | 3-Cl | 0.67 |
| 353 | 1 | 3-Br | 0.66 |
| 354 | 1 | 3-F | 0.69 |
| 355 | 1 | 3-$C_2H_5$ | 0.67 |
| 356 | 1 | 3-$C_3H_7$ | 0.68 |
| 357 | 1 | 3-$OCH_3$ | 0.66 |
| 358 | 1 | 3-$OC_2H_5$ | 0.67 |
| 359 | 1 | 3-$SCH_3$ | 0.69 |
| 360 | 1 | 3-cyclohexyl | 0.70 |
| 361 | 1 | 3-$COOCH_3$ | 0.70 |
| 362 | 1 | 3-$COOC_2H_5$ | 0.71 |
| 363 | 1 | 3-$COOC_5H_{11}$ | 0.70 |
| 364 | 1 | 3-COO—$C_4H_9$ | 0.72 |
| 365 | 1 | 3-$CF_3$ | 0.70 |
| 366 | 1 | 3-O—CO—$CH_3$ | 0.67 |
| 367 | 2 | 3-Cl | 0.66 |
| 368 | 2 | 3-F | 0.68 |
| 369 | 2 | 3-Br | 0.66 |
| 370 | 2 | 3-$C_2H_5$ | 0.66 |
| 371 | 2 | 3-n-$C_4H_9$ | 0.68 |
| 372 | 2 | 3-$SCH_3$ | 0.68 |
| 373 | 2 | 3-cyclohexyl | 0.69 |

TABLE 8-continued

| | | | |
|---|---|---|---|
| 374 | 2 | 3-(phenyl) | 0.69 |
| 375 | 2 | 3-COO—C$_3$H$_7$ | 0.70 |
| 376 | 2 | 3-COOC$_4$H$_9$ | 0.70 |
| 377 | 2 | 3-COOC$_5$H$_{11}$ | 0.71 |
| 378 | 2 | 3-CF$_3$ | 0.70 |
| 379 | 3 | 2-Cl | 0.68 |
| 380 | 3 | 3-Cl | 0.69 |
| 381 | 3 | 4-Cl | 0.70 |
| 382 | 3 | 4-CH$_3$ | 0.70 |
| 383 | 3 | 4-OCH$_3$ | 0.67 |
| 384 | 3 | 4-(phenyl) | 0.70 |
| 385 | 3 | 3-COOC$_4$H$_9$ | 0.69 |
| 386 | 3 | 4-COOC$_5$H$_{11}$ | 0.70 |
| 387 | 3 | 4-O-(phenyl) | 0.68 |
| 388 | 3 | 3-CF$_3$ | 0.69 |
| 389 | 3 | 3-F | 0.70 |
| 390 | 4 | 2-Cl | 0.68 |
| 391 | 4 | 3-F | 0.68 |
| 392 | 4 | 4-F | 0.67 |
| 393 | 4 | 2-CH$_3$ | 0.65 |
| 394 | 4 | 4-CH$_3$ | 0.68 |
| 395 | 4 | 4-OCH$_3$ | 0.66 |
| 396 | 4 | 4-O—n—C$_4$H$_9$ | 0.67 |
| 397 | 4 | 4-(phenyl) | 0.72 |
| 398 | 4 | 3-COOC$_5$H$_{11}$ | 0.72 |
| 399 | 4 | 4-COOC$_5$H$_{11}$ | 0.71 |
| 400 | 4 | 4-O-(phenyl) | 0.69 |

EXAMPLE 401

(a) When the process is carried out as described in Example 165a and, instead of 1,8-diamino-4,5-di(4-tosylamino)-2,7-diphenoxyanthraquinone, 5.7 g of 1,8-diamino-4,5-dihydroxy-2,7-diphenoxyanthraquinone (preparation see Example 350a) are used, then 4.1 g, corresponding to 78% of theory, of 1,8-diamino-4,5-dihydroxy-2,7-di-n-butoxyanthraquinone are obtained, the colour shade of which on silica gel is a blue with the Indicator Number 14.

(b) The abovementioned dyestuff has, in the liquid-crystal mixture mentioned in Example 1c, an order parameter S of 0.71.

EXAMPLE 402

(a) When the process described in Example 165a is carried out and, instead of the anthraquinone derivative mentioned there, 5.7 g of 1,8-diamino-4,5-dihydroxy-3,6-diphenoxyanthraquinone (preparation see Example 351a) are used, then 4.2 g, corresponding to 80% of theory, of 1,8-diamino-4,5-dihydroxy-3,6-di-n-butoxyanthraquinone are obtained, the colour shade of which on silica gel is a blue with the Indicator Number 14.

(b) The abovementioned dyestuff has, in the liquid-crystal mixture mentioned in Example 1c, an order parameter S of 0.73.

EXAMPLES 403 TO 414

When other (substituted) alcohols are used in Examples 401a and 402a instead of the n-butanol mentioned there, then the analogous dyestuffs mentioned in Table 9 are obtained, which, in the liquid-crystal mixture mentioned in Example 1c, have the order parameters S mentioned in the table and the color tints of which on silica gel are a blue with the Indicator Number 14 according to the Colour Index Hue Indication Chart.

TABLE 9

Type 1: 1,8-diamino-4,5-dihydroxy-2,7-di(O-R)-anthraquinone

Type 2: 1,8-diamino-4,5-dihydroxy-3,6-di(O-R)-anthraquinone

| Example | Type | R | S |
|---|---|---|---|
| 403 | 1 | —CH$_3$ | 0.67 |
| 404 | 1 | —n-C$_5$H$_{11}$ | 0.68 |
| 405 | 1 | —(CH$_2$)$_2$-(phenyl) | 0.70 |
| 406 | 1 | —CH$_2$-(phenyl) | 0.69 |
| 407 | 2 | —C$_2$H$_5$ | 0.68 |
| 408 | 2 | —n-C$_3$H$_7$ | 0.68 |
| 409 | 2 | —n-C$_5$H$_{11}$ | 0.69 |
| 410 | 2 | —(CH$_2$)$_2$—OC$_2$H$_5$ | 0.69 |
| 411 | 2 | —(CH$_2$)$_2$-(phenyl) | 0.71 |
| 412 | 2 | —(CH$_2$)$_2$—O-(phenyl) | 0.69 |
| 413 | 2 | —(CH$_2$)$_5$—O—CH$_2$-(phenyl) | 0.70 |

TABLE 9-continued

| 414 | 2 | 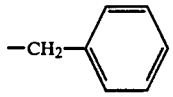 —CH₂— | 0.69 |
|---|---|---|---|

EXAMPLE 415

(a) When the process according to Example 190a is carried out and, instead of the anthraquinone component mentioned there, 11.7 g of 1,5-diamino-4,8-dihydroxy-2,6-dibromoanthraquinone, compare Example 348a, are used, then 3.8 g, corresponding to 31% of theory, of 1,5-diamino-4,8-dihydroxy-2-phenoxy-6-bromoanthraquinone are obtained.

It is also possible to use the procedure analogous to Example 340a and the same dyestuff is obtained in somewhat improved yield.

The colour shade of the dyestuff adsorbed on silica gel is a blue with the Indicator Number 14 (Colour Index Hue Indication Chart).

(b) The dyestuff prepared in Example 415a has, in the liquid-crystal mixture mentioned in Example 1c, an order parameter S of 0.79.

EXAMPLE 416

(a) When 11.7 g of 1,5-diamino-4,8-dihydroxy-3,7-dibromoanthraquinone, compared Example 349a, are used as the anthraquinone component in Example 415a, then 3.9 g, corresponding to 32% of theory, of 1,5-diamino-4,8-dihydroxy-3-phenoxy-7-bromoanthraquinone are obtained quite analogously, the colour shade of which, adsorbed on silica gel, is a blue of Indicator Number 14 (Colour Index Hue Indication Chart).

(b) The dyestuff prepared above, in the liquid-crystal mixture mentioned in Example 1c, has an order parameter S of 0.73.

EXAMPLE 417

(a) When 11.7 g of 1,8-diamino-4,5-dihydroxy-2,7-dibromoanthraquinone (compare Example 350a) are used as the anthraquinone component in Example 415a, then 4.5 g, corresponding to 37% of theory, of 1,8-diamino-4,5-dihydroxy-2-phenoxy-7-bromoanthraquinone are correspondingly obtained. Colour shade on silica gel: blue of Indicator Number 14 (Colour Index Hue Indication Chart).

(b) The dyestuff prepared above has, in the liquid-crystal mixture mentioned in Example 1c, an order parameter S of 0.73. Similarly good order parameters are also found in other liquid-crystal mixtures, for example those listed on pages 15 and 16.

EXAMPLE 418

(a) When 11.7 g of 1,8-diamino-4,5-dihydroxy-3,6-dibromoanthraquinone (compare Example 351a) are used as the anthraquinone component in Example 415a, 4.0 g, corresponding to 33% of theory, of 1,8-diamino-4,5-di-hydroxy-3-phenoxy-6-bromoanthraquinone are correspondingly obtained. Colour shade on silica gel: blue of Indicator Number 14 (Colour Index Hue Indication Chart).

(b) The dyestuff prepared above has, in the liquid-crystal mixture indicated in Example 1c, an order parameter S of 0.74.

EXAMPLES 419 TO 449

When other substituted phenols are used in Examples 415a, 416a, 417a or 418a instead of the phenols mentioned there, then the analogous dyestuffs mentioned in Table 10 are obtained, which, in the liquid-crystal mixture indicated in Example 1c have the order parameters S mentioned in Table 10 and the colour tints of which on silica gel are a blue between the Indicator Number 14 and 15 according to the Colour Index Hue Indication Chart.

TABLE 10

Type 1, Type 2, Type 3, Type 4

| Example | Type | R | S |
|---|---|---|---|
| 419 | 1 | 2-Cl | 0.69 |
| 420 | 1 | 3-Cl | 0.70 |
| 421 | 1 | 4-t-C₄H₉ | 0.67 |
| 422 | 1 | 4-S—CH₃ | 0.70 |
| 423 | 1 | 4—⟨phenyl⟩ | 0.70 |
| 424 | 1 | 4-COOC₅H₁₁ | 0.71 |
| 425 | 1 | 3-F | 0.70 |
| 426 | 2 | 3-Cl | 0.70 |
| 427 | 2 | 4-Cl | 0.71 |
| 428 | 2 | 4-CH₃ | 0.69 |
| 429 | 2 | 4—⟨phenyl⟩ | 0.69 |
| 430 | 2 | 3-COOC₅H₁₁ | 0.70 |
| 431 | 2 | 3-F | 0.70 |
| 432 | 3 | 3-F | 0.71 |
| 433 | 3 | 2-CH₃ | 0.72 |
| 434 | 3 | 3-C₂H₅ | 0.68 |
| 435 | 3 | 4-t-C₄H₉ | 0.68 |
| 436 | 3 | 3—⟨phenyl⟩ | 0.70 |
| 437 | 3 | 4-COOC₃H₇ | 0.71 |
| 438 | 3 | 4-O—⟨phenyl⟩ | 0.68 |
| 439 | 4 | 3-CH₂ | 0.69 |
| 440 | 4 | 4-CH₃ | 0.70 |
| 441 | 4 | 3-F | 0.69 |
| 442 | 4 | 3-O—t-C₄H₉ | 0.69 |
| 443 | 4 | 4—⟨H⟩ | 0.68 |
| 444 | 4 | 4—⟨phenyl⟩ | 0.70 |

TABLE 10-continued

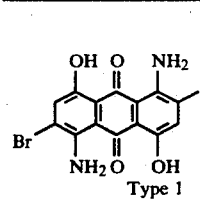
Type 1

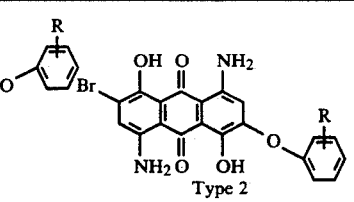
Type 2

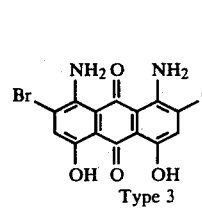
Type 3

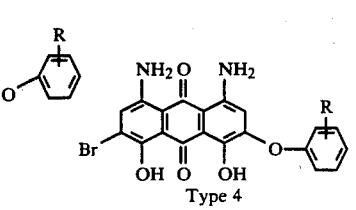
Type 4

| Example | Type | R | S |
|---------|------|---|---|
| 445 | 4 | 3-COO—C$_3$H$_7$ | 0.71 |
| 446 | 4 | 4-COO—C$_5$H$_{11}$ | 0.72 |
| 447 | 4 | 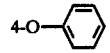 4-O— | 0.68 |
| 448 | 4 | 3-CF$_3$ | 0.67 |
| 449 | 4 | 3-CN | 0.66 |

EXAMPLE 450

(a) When 5.5 of 1,8-diamino-4,5-dihydroxy-2-phenoxy-7-bromoanthraquinone (preparation see Example 417a) are used in Example 338a instead of the anthraquinone component mentioned there, then 4.5 g, corresponding to 85% of theory, of 1,8-diamino-4,5-dihydroxy-2-n-butoxy-7-bromoanthraquinone are obtained quite correspondingly, the colour shade of which on silica gel is a blue with the Indicator Number 14.

(b) The dyestuff prepared above has, in the liquid-crystal mixture indicated in Example 1c, an order parameter S of 0.65.

EXAMPLES 451 TO 466

When, in Example 450a, instead of the anthraquinone component of Example 417a mentioned there, one of those prepared in Examples 415a, 416a or 418a is used and, instead of the n-butanol, another (substituted) alcohol is used, then the analogous dyestuffs, which are compiled in Table 11, are obtained, which, in the liquid-crystal mixture mentioned in Example 1c, have the order parameter S mentioned in the table and the colour tint on silica gel of which is a blue with the Indicator Number 14 according to the Colour Index Hue Indication Chart.

TABLE 11

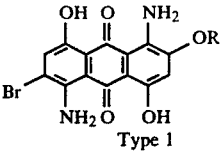
Type 1

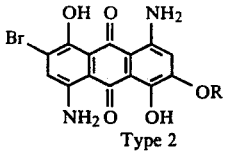
Type 2

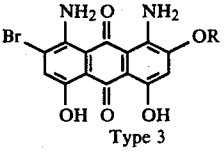
Type 3

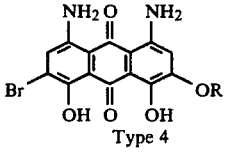
Type 4

| Example | Type | R | S |
|---------|------|---|---|
| 451 | 1 | —n-C$_3$H$_7$ | 0.65 |
| 452 | 1 | —(CH$_2$)$_2$—OC$_2$H$_5$ | 0.63 |
| 453 | 1 | 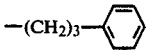 —(CH$_2$)$_3$— | 0.67 |
| 454 | 1 | 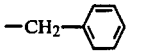 —CH$_2$— | 0.66 |
| 455 | 2 | —n-C$_5$H$_{11}$ | 0.66 |
| 456 | 2 | 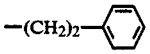 —(CH$_2$)$_2$— | 0.63 |
| 457 | 2 | 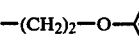 —(CH$_2$)$_2$—O— | 0.64 |
| 458 | 2 | 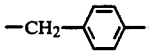 —CH$_2$—⟨⟩—CH$_3$ | 0.66 |
| 459 | 3 | —n-C$_3$H$_7$ | 0.65 |
| 460 | 3 | —(CH$_2$)$_2$—OC$_4$H$_9$ | 0.64 |
| 461 | 3 |  —(CH$_2$)$_2$— | 0.64 |
| 462 | 3 |  —CH$_2$— | 0.65 |
| 463 | 4 | —n-C$_3$H$_7$ | 0.66 |
| 464 | 4 |  —(CH$_2$)$_2$— | 0.65 |
| 465 | 4 |  —(CH$_2$)$_2$—O— | 0.64 |
| 466 | 4 | 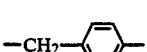 —CH$_2$—⟨⟩—CH$_3$ | 0.65 |

EXAMPLE 467

(a) 257.5 g of 1-amino-6-chloroanthraquinone are brominated in accordance with the procedure indicated in BIOS 1484, page 6 for 1-aminoanthraquinone and 387 g, corresponding to 93% of theory, of 1-amino-2,4-dibromo-6-chloroanthraquinone are obtained.

(b) When 104 g of 1-amino-2,4-dibromo-6-chloroanthraquinone (preparation see Example 467a) are treated with boric acid/sulphuric acid according to the procedure for 1-amino-2,4-dibromoanthraquinone in BIOS 1484, page 5, then 83.9 g, corresponding to 95% of theory, of 1-amino-2-bromo-4-hydroxy-6-chloroanthraquinone are obtained.

(c) 113 g of phenol and 20.7 g of dry potassium carbonate are partially distilled under waterpump vacuum, about 13 g being distilled off. Then 70.5 g of 1-amino-2-bromo-4-hydroxy-6-chloroanthraquinone (preparation see Example 467b) are introduced and heated at 160° C. until, after about 1.25 hours, the starting product has entirely reacted. The mixture at about 70° C. is diluted with 150 ccm of methanol, filtered cold with suction, washed with methanol and hot water and dried at 60° C. 60.6 g, corresponding to 82% of theory, of 1-amino-2-phenoxy-4-hydroxy-6-chloroanthraquinone are obtained, the colour shade of which on silica gel is a pink tinged with blue having the Indicator Number 51 (Colour Index Hue Indication chart).

(d) The dyestuff prepared above has, in the liquid-crystal mixture indicated in Example 1c, an order parameter S of 0.70. Similarly good order parameters are also found in other liquid-crystal mixtures, for example those listed on pages 15 and 16.

EXAMPLE 468

(a) When Example 467a is repeated and 257.5 g 1-amino-7-chloroanthraquinone are used as the anthraquinone component, then 376 g, corresponding to 90% of theory, of 1-amino-2,4-dibromo-7-chloroanthraquinone are obtained.

(b) When Example 467b is repeated and 104 g of 1-amino-2,4-dibromo-7-chloroanthraquinone (preparation see Example 468a) are used as the anthraquinone component, 85.3 g, corresponding to 96% of theory, of 1-amino-2-bromo-4-hydroxy-7-chloroanthraquinone are obtained.

(c) When Example 467c is repeated but 70.5 g of the 1-amino-2-bromo-4-hydroxy-7-chloroanthraquinone prepared in the foregoing example is used as the anthraquinone component, 53.8 g, corresponding to 73% of theory, of 1-amino-2-phenoxy-4-hydroxy-7-chloroanthraquinone are obtained, the colour shade of which on silica gel is a pink tinged with blue having the Indicator Number 51 (Colour Index Hue Indication Chart).

(d) The dyestuff prepared above, has in the liquid-crystal mixture indicated in Example 1c, an order parameter S of 0.67. Similarly good order parameters are also found in other liquid-crystal mixtures, for example those listed on pages 15 and 16.

EXAMPLE 469

(a) 1-Hydroxy-6-chloroanthraquinone, which has been obtained by diazotisation and boiling of 1-amino-6-chloroanthraquinone (compare H. Roemer, Ber. dtsch. chem. Ges. 15 (1882), 1786; 16 (1883), 363), is brominated in 5% oleum (see German Patent Specification No. 490,637) and 1-hydroxy-2,4-dibromo-6-chloroanthraquinone is obtained, which is converted into 1-hydroxy-2-bromo-4-amino-6-chloroanthraquinone by tosylamide fusion with subsequent cleavage.

(b) When 70.5 g of the 1-hydroxy-2-bromo-4-amino-6-chloroanthraquinone prepared above are subjected to a phenolate fusion as described in Example 467c, then 59 g, corresponding to 80% of theory, of 1-hydroxy-2-phenoxy-4-amino-6-chloroanthraquinone are obtained, the colour shade of which on silica gel is a pink tinged with blue having the Indicator Number 51 (Colour Index Hue Indication Chart).

(c) The dyestuff prepared above has, in the liquid-crystal mixture indicated in Example 1c, an order parameter S of 0.73. Similarly good order parameters are also found in other liquid-crystal mixtures, for example those listed on pages 15 and 16.

EXAMPLE 470

(a) When the process as described in Example 469a is carried out, but starting with 1-amino-7-chloroanthraquinone, then 1-hydroxy-2-bromo-4-amino-7-chloroanthraquinone is finally obtained.

(b) When 70.5 g of the 1-hydroxy-2-bromo-4-amino-7-chloroanthraquinone prepared above are subjected to a phenolate fusion as described in Example 467c, then 61 g, corresponding to 83% of theory, of 1-hydroxy-2-phenoxy-4-amino-7-chloro-anthraquinone are obtained, the colour shade of which on silica gel is a pink tinged with blue having the Indicator Number of 51 (Colour Index Hue Indication Chart).

(c) The dyestuff prepared above has, in the liquid-crystal mixture indicated in Example 1c, an order parameter S of 0.70. Similarly good order parameters are also found in other liquid-crystal mixtures, for example those listed on pages 15 and 16.

EXAMPLES 471 TO 502

When other (substituted) phenols are used in Examples 467c, 468c, 469b and 470b instead of the phenols mentioned there, then the analogous dyestuffs compiled in Table 12 are obtained, which, in the liquid-crystal mixture mentioned in Example 1c, have the order parameters S mentioned in the table, and the colour tints of which on silica gel are a pink tinged with blue having the Indicator Number 51 according to the Colour Index Hue Indication Chart.

TABLE 12

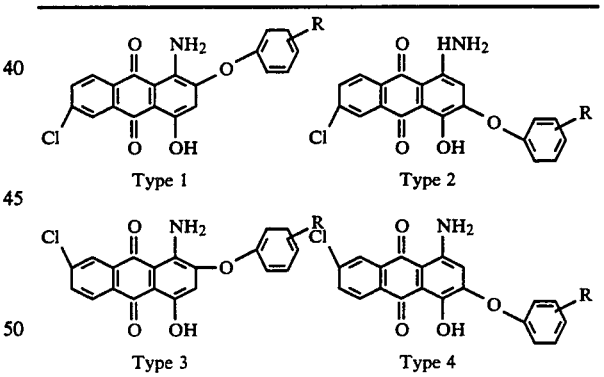

| Example | Type | R | S |
|---|---|---|---|
| 471 | 1 | 3-Cl | 0.65 |
| 472 | 1 | 4-Cl | 0.66 |
| 473 | 1 | 3-F | 0.65 |
| 474 | 1 | 2-CH$_3$ | 0.64 |
| 475 | 1 | 4-t-C$_4$H$_9$ | 0.63 |
| 476 | 1 | 4-OCH$_3$ | 0.63 |
| 477 | 1 | 4-C$_6$H$_5$ | 0.66 |
| 478 | 1 | 3-COOC$_5$H$_{11}$ | 0.67 |
| 479 | 1 | 4-SCH$_3$ | 0.66 |
| 480 | 2 | 3-Cl | 0.63 |
| 481 | 2 | 3-F | 0.65 |
| 482 | 2 | 3-i-C$_3$H$_7$ | 0.62 |
| 483 | 2 | 3-O—C$_4$H$_9$ | 0.63 |

TABLE 12-continued

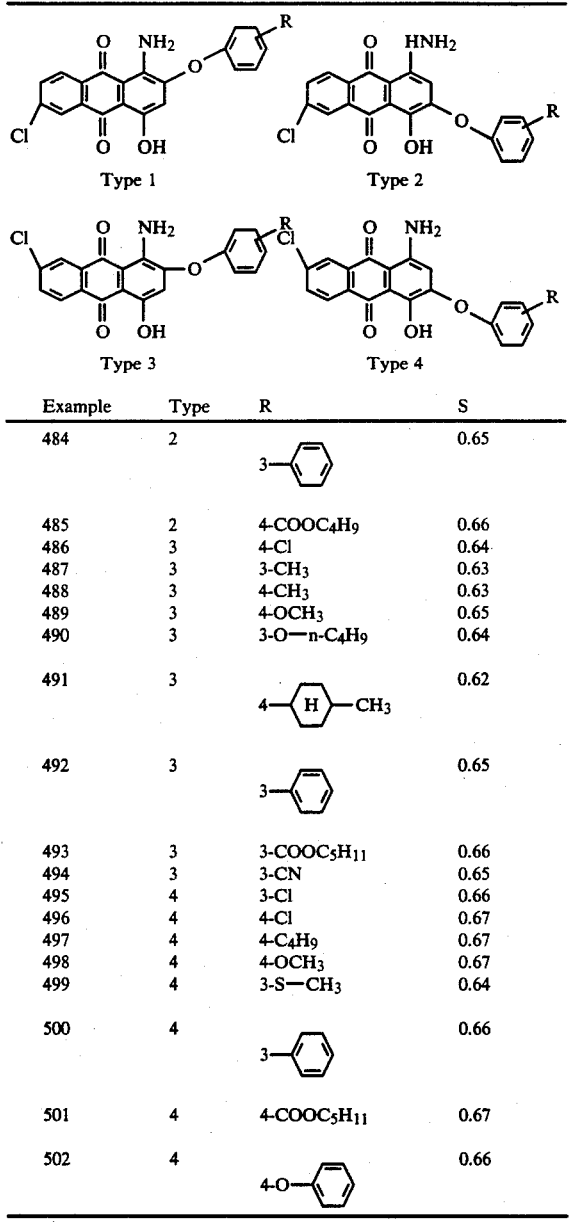

| Example | Type | R | S |
|---|---|---|---|
| 484 | 2 | 3-⌬ | 0.65 |
| 485 | 2 | 4-COOC$_4$H$_9$ | 0.66 |
| 486 | 3 | 4-Cl | 0.64 |
| 487 | 3 | 3-CH$_3$ | 0.63 |
| 488 | 3 | 4-CH$_3$ | 0.63 |
| 489 | 3 | 4-OCH$_3$ | 0.65 |
| 490 | 3 | 3-O—n-C$_4$H$_9$ | 0.64 |
| 491 | 3 | 4-⟨H⟩—CH$_3$ | 0.62 |
| 492 | 3 | 3-⌬ | 0.65 |
| 493 | 3 | 3-COOC$_5$H$_{11}$ | 0.66 |
| 494 | 3 | 3-CN | 0.65 |
| 495 | 4 | 3-Cl | 0.66 |
| 496 | 4 | 4-Cl | 0.67 |
| 497 | 4 | 4-C$_4$H$_9$ | 0.67 |
| 498 | 4 | 4-OCH$_3$ | 0.67 |
| 499 | 4 | 3-S—CH$_3$ | 0.64 |
| 500 | 4 | 3-⌬ | 0.66 |
| 501 | 4 | 4-COOC$_5$H$_{11}$ | 0.67 |
| 502 | 4 | 4-O-⌬ | 0.66 |

EXAMPLE 503

(a) A mixture of 48.8 g of β-phenylethanol, 45.2 g of ε-caprolactam, 5.2 g of dry potassium carbonate and 18.3 g of 1-amino-2-phenoxy-4-hydroxy-6-chloroanthraquinone (preparation see Example 467c) is heated at 140° C. until, after about 4 hours, the reaction is complete. The mixture at 70° C. is diluted with 100 ccm of methanol, allowed to cool down, filtered with suction, washed with methanol and hot water and dried at 60° C. 14 g, corresponding to 71% of theory, of 1-amino-2-(2-phenylethoxy)-4-hydroxy-6-chloroanthraquinone are obtained, the colour shade of which on silica gel is a pink tinged with blue between Indicator Numbers 50 and 51 (Colour Index Hue Indication Chart).

(b) The dyestuff prepared above has, in the liquid-crystal mixture indicated in Example 1c, an order parameter of 0.62.

EXAMPLE 504

(a) When 18.3 g of 1-amino-2-phenoxy-4-hydroxy-7-chloroanthraquinone (preparation see Example 468c) are used as the anthraquinone component in Example 503a, then 13.6 g, corresponding to 69% of theory, of 1-amino-2-(2-phenethoxy)-4-hydroxy-7-chloroanthraquinone are obtained, the colour shade of which on silica gel is a pink tinged with blue between the Indicator Numbers 50 and 51 (Colour Index Hue Indication Chart).

(b) The dyestuff prepared above has, in the liquid-crystal mixture mentioned in Example 1c, an order parameter of 0.58.

EXAMPLES 505 TO 524

When, in Examples 503a and 504a, instead of the anthraquinone components mentioned there, those prepared in Example 469b or 470b are used, or in place of the 2-phenylethanol mentioned in Examples 503a and 504a other (substituted) alcohols are used, then the analogous dyestuffs compiled in Table 13 are obtained, which, in the liquid-crystal mixture mentioned in Example 1c, have the order parameters S mentioned in the table and the colour tints of which on silica gel are pink tinged with red between Indicator Number 50 and 51 according to the Colour Index Hue Indication Chart.

TABLE 13

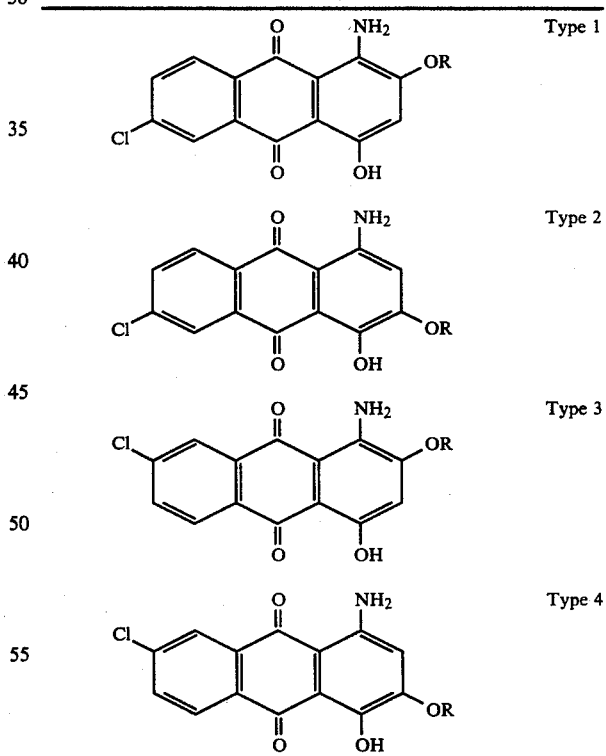

| Example | Type | R | S |
|---|---|---|---|
| 505 | 1 | —n-C$_3$H$_7$ | 0.59 |
| 506 | 1 | —(CH$_2$)$_2$—OC$_2$H$_5$ | 0.60 |
| 507 | 1 | —(CH$_2$)$_2$—O-⌬ | 0.60 |

TABLE 13-continued

| | | | |
|---|---|---|---|
| 508 | 1 | —CH₂—⟨phenyl⟩ | 0.61 |
| 509 | 2 | —n-C₄H₉ | 0.64 |
| 510 | 2 | —(CH₂)₂—⟨phenyl⟩ | 0.63 |
| 511 | 2 | —(CH₂)₃—OCH₃ | 0.62 |
| 512 | 2 | —(CH₂)₄—O—CH₂—⟨phenyl⟩ | 0.61 |
| 513 | 2 | —CH₂—⟨phenyl⟩—CH₃ | 0.62 |
| 514 | 3 | —n-C₃H₇ | 0.61 |
| 515 | 3 | —n-C₅H₁₁ | 0.63 |
| 516 | 3 | —(CH₂)₂—OCH₃ | 0.61 |
| 517 | 3 | —CH₂—⟨phenyl⟩ | 0.62 |
| 518 | 4 | —n-C₃H₇ | 0.62 |
| 519 | 4 | —n-C₄H₉ | 0.63 |
| 520 | 4 | —(CH₂)₂—O—C₄H₉ | 0.61 |
| 521 | 4 | —(CH₂)₃—O—CH₂—⟨phenyl⟩ | 0.61 |
| 522 | 4 | —CH₂—⟨phenyl⟩ | 0.62 |
| 523 | 4 | —CH₃ | 0.60 |
| 524 | 4 | —(CH₂)₂—⟨phenyl⟩ | 0.63 |

EXAMPLE 525

(a) 104 g of 1-amino-2,4-dibromo-6-chloroanthraquinone (preparation compare Example 467a), 57 g of 4-toluenesulphonamide, 29 g of dry potassium acetate and 1,700 ccm of n-pentanol are partially distilled off. Then, at about 100° C., 1 g each of copper acetate and copper powder are added and the mixture is heated to boiling, with stirring and passing nitrogen over, low-boiling constituents being allowed to distil out through a descending condenser, so that a reaction temperature of above 130° C. is always achieved. When the starting material has entirely reacted, the mixture is filtered with suction while still warm, washed with methanol and then with hot water and dried at 60° C. 96 g (corresponding to 75% of theory, of 1-amino-2-bromo-4-(4-tosylamino)-6-chloroanthraquinone are obtained.

(b) 120 g of phenol and 10.4 g of dry potassium carbonate are heated dry, that is to say about 10 g of distillate is distilled out. Then 50.6 g of 1-amino-2-bromo-4-(4-tosylamino)-6-chloroanthraquinone prepared above is introduced and the mixture is heated with stirring at 160° C. until it has completely disappeared. After cooling down to about 70° C., 100 ccm of methanol is added dropwise, the solid is filtered off cold with suction, washed with methanol and hot water and dried at 60° C. 45 g, corresponding to 86% of theory, of 1-amino-2-phenoxy-4-(4-tosylamino)-6-chloroanthraquinone are obtained.

(c) 10 g of the dyestuff prepared above are introduced into 100 ccm of 90 percent sulphuric acid, during which the temperature should not exceed 10° C., and then stirred at 10° C. until, after about 1 hour, the starting material is completely cleaved. The solution obtained is poured onto 200 g of ice and the reaction mixture is worked up as described in Example 1b. 6.5 g, corresponding to 92% of theory, 1,4-diamino-2-phenoxy-6-chloroanthraquinone are obtained, the colour shade of which on silica gel is a brilliant violet between Indicator Numbers 10 and 11 (Colour Index Hue Indication Chart).

(d) The dyestuff prepared above has, in the liquid-crystal mixture mentioned in Example 1c, an order parameter of 0.70.

EXAMPLE 526

(a) When the procedure corresponding to Examples 525a to 525c is carried out and, instead of 1-amino-2,4-dibromo-6-chloroanthraquinone, the corresponding amount of 1-amino-2,4-dibromo-7-chloroanthraquinone (preparation see Example 468a) is used, then, after tosylamide fusion, phenolate fusion and cleavage, 1,4-diamino-2-phenoxy-7-chloroanthraquinone is obtained in good yield, which, on silica gel, is also a brilliant violet between Indicator Numbers 10 and 11 (Colour Index Hue Indication Chart).

(b) The dyestuff mentioned above has, in the liquid-crystal mixture used in Example 1c, an order parameter of 0.68.

EXAMPLES 527–549

If other substituted phenols are used in Examples 525b and 526a in place of the phenols employed there, then the analogous dyestuffs compiled in Table 14 are obtained, which, in the liquid-crystal mixture mentioned in Example 1c, have the order parameter S mentioned in the table and the colour tints of which on silica gel are a brilliant violet between the Indicator Numbers 10 and 11 according to the Colour Index Hue Indication Chart.

TABLE 14

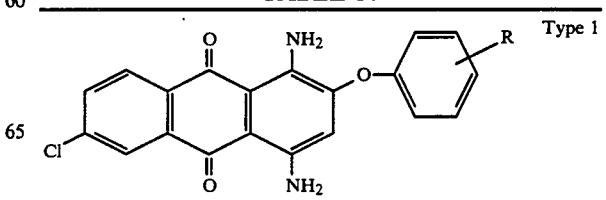

Type 1

TABLE 14-continued

Type 2 structure: chloroanthraquinone with NH2 groups and O-phenyl-R substituent

| Example | Type | R | S |
|---------|------|---|------|
| 527 | 1 | 2-Cl | 0.68 |
| 528 | 1 | 3-Cl | 0.70 |
| 529 | 1 | 3-F | 0.71 |
| 530 | 1 | 3-CH$_3$ | 0.73 |
| 531 | 1 | 4-t-C$_4$H$_9$ | 0.74 |
| 532 | 1 | 3-OCH$_3$ | 0.70 |
| 533 | 1 | 4-SCH$_3$ | 0.72 |
| 534 | 1 | 4-(phenyl) | 0.73 |
| 535 | 1 | 4-COOC$_2$H$_5$ | 0.72 |
| 536 | 1 | 3-COOC$_5$H$_{11}$ | 0.74 |
| 537 | 1 | 4-CH$_2$-(phenyl) | 0.69 |
| 538 | 2 | 4-Cl | 0.65 |
| 539 | 2 | 3-F | 0.66 |
| 540 | 2 | 4-F | 0.66 |
| 541 | 2 | 4-CH$_3$ | 0.64 |
| 542 | 2 | 4-n-C$_5$H$_{11}$ | 0.66 |
| 543 | 2 | 4-OCH$_3$ | 0.66 |
| 544 | 2 | 4-SCH$_3$ | 0.64 |
| 545 | 2 | 4-(phenyl) | 0.64 |
| 546 | 2 | 4-COOC$_2$H$_5$ | 0.66 |
| 547 | 2 | 4-COOC$_5$H$_{11}$ | 0.67 |
| 548 | 2 | 4-O-(phenyl) | 0.66 |
| 549 | 2 | 3-CF$_3$ | 0.67 |

EXAMPLE 550

(a) A mixture of 48.8 g of 2-phenylethanol, 45.2 g of ε-caprolactam, 5.2 g of dry potassium carbonate and 25.9 g of 1-amino-2-phenoxy-4-(4-tosylamino)-6-chloroanthraquinone (preparation see Example 525b) is heated at 140° C. until the starting material has completely reacted. It is then diluted at about 70° C. with 100 ccm of methanol, filtered cold with suction, washed with methanol and then with hot water and dried at 60° C. 21 g, corresponding to 76% of theory, of 1-amino-2-(2-phenylethoxy)-B  4-(4-tosylamino)-6-chloroanthraquinone are obtained.

(b) 10 g of the compound obtained above are cleaved in 100 ccm of 90 percent sulphuric acid in accordance with Example 525c and 6.5 g, corresponding to 90% of theory, of 1,4-diamino-2-(2-phenylethoxy)-6-chloroanthraquinone are obtained, the colour shade of which on silica gel is a brilliant violet between the Indicator Numbers 10 and 11 (Colour Index Hue Indication Chart).

(c) The dyestuff prepared above has, in the liquid-crystal mixture used in Example 1c, an order parameter of 0.67.

EXAMPLES 551 TO 561

When, in Example 550a, instead of the anthraquinone component mentioned there, 1-amino-2-phenoxy-4-(4-tosylamino)-7-chloroanthraquinone prepared as intermediate product in Example 526a or, instead of the 2-phenylethanol used in Example 550a, other (substituted) alcohols are used, then, after cleavage in analogy to Example 550b, the analogous dyestuffs compiled in Table 15 are obtained, which, in the liquid-crystal mixture mentioned in Example 1c, have the order parameters S mentioned in the table and the colour tints of which on silica gel are a brilliant violet between the Indicator Numbers 10 and 11 according to the Colour Index Hue Indication Chart.

TABLE 15

Type 1: 6-chloro-1,4-diamino-2-OR-anthraquinone

Type 2: 7-chloro-1,4-diamino-2-OR-anthraquinone

| Example | Type | R | S |
|---------|------|---|------|
| 551 | 1 | —n-C$_3$H$_7$ | 0.66 |
| 552 | 1 | —n-C$_4$H$_9$ | 0.66 |
| 553 | 1 | —n-C$_6$H$_{13}$ | 0.63 |
| 554 | 1 | —(CH$_2$)$_3$—OCH$_3$ | 0.63 |
| 555 | 1 | —(CH$_2$)$_2$—O-(phenyl) | 0.64 |
| 556 | 1 | —CH$_2$-(phenyl) | 0.65 |
| 557 | 2 | —n-C$_3$H$_7$ | 0.67 |
| 558 | 2 | —n-C$_4$H$_9$ | 0.68 |
| 559 | 2 | —(CH$_2$)$_2$-(phenyl) | 0.65 |
| 560 | 2 | —(CH$_2$)$_2$—O-(phenyl) | 0.63 |

TABLE 15-continued

| 561 | 2 | 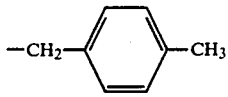 | 0.65 |

EXAMPLE 562

(a) 9.9 g of 1,8-dihydroxy-4,5-dinitroanthraquinone are dissolved in a mixture of 15.6 g of boric acid and 228 g of 100 percent sulphuric acid. The solution obtained is cooled down to $-10°$ to $0°$ C. and 7.4 g of anisole are added dropwise. The temperature is maintained for a further 1 hour at $0°$ C. and then the mixture is poured onto 240 g of ice and heated to reflux for 4 hours. The solid is filtered off with suction, washed with water to neutrality and dried at $60°$ C. 12.6 g of 1,8-dihydroxy-2,7-di(4-methoxyphenyl)-4,5-dinitroanthraquinone, corresponding to a yield of 77% of theory, are obtained.

(b) 12.5 g of the crude product obtained are suspended in a solution of 75 g of sodium sulphide (nonahydrate) in 375 ccm of water and 48 ccm of ethanol. The mixture is heated to reflux for 2 hours, filtered off hot with suction and the filter cake is washed hot to neutrality. The residue is then boiled with 450 ccm of 10 percent hydrochloric acid, filtered hot with suction, washed to neutrality and dried at 60 C. 6 g, corresponding to 54% of theory, of 1,8-dihydroxy-2,7-di(4-methoxyphenyl)-4,5-diaminoanthraquinone are obtained, the colour shade of which on silica gel is a blue tinged with red between Indicator Numbers 13 and 14 (Colour Index Hue Indication Chart).

(c) The dyestuff prepared above has, in the liquid-crystal mixture used in Example 1c, an order parameter of 0.76.

EXAMPLES 563 TO 582

When, in Example 562a, instead of the anisole mentioned there, other (substituted) phenols or anisoles or optionally substituted heterocyclic compounds, such as, for example, thiophen, and then reduction is carried out in analogy to Example 562b, then the analogous dyestuffs compiled in Table 16 are obtained, which, in the liquid-crystal mixture mentioned in Example 1c, have the order parameters S mentioned in the table and the colour tints of which on silica gel are a blue tinged with red between the Indicator Numbers 13 and 14 according to the Colour Index Hue Indication Chart.

TABLE 16

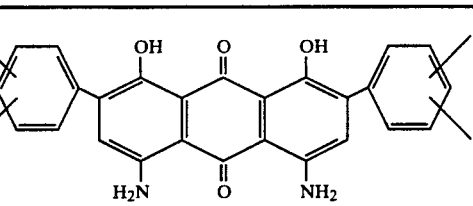

| Example | $R_1$, $R_2$ | S |
|---|---|---|
| 563 | H, 4-$C_2H_5$ | 0.74 |
| 564 | H, 4-OH | 0.72 |
| 565 | H, 4-$CH_3$ | 0.75 |
| 566 | H, 4-O—$C_2H_5$ | 0.74 |
| 567 | H, 4-O—$C_3H_7$ | 0.75 |
| 568 | H, 4-O—n-$C_4H_9$ | 0.74 |
| 569 | H, 4-O—n-$C_5H_{11}$ | 0.76 |
| 570 | H, 4-$SCH_3$ | 0.76 |
| 571 | 3-$CH_3$, 4-$OCH_3$ | 0.75 |
| 572 | 3-Cl, 4-$OCH_3$ | 0.74 |
| 573 | 2-$OCH_3$, 4-$OCH_3$ | 0.75 |
| 574 | 2-$CH_3$, 4-$OCH_3$ | 0.73 |
| 575 | 3-F, 4-$OCH_3$ | 0.75 |
| 576 | 2-Cl, 4-$OCH_3$ | 0.73 |
| 577 | 3-$CH_3$, 4-$CH_3$ | 0.72 |
| 578 | 2-$OCH_3$, 5-$CH_3$ | 0.74 |
| 579 | 2-$OC_4H_9$, 5-Cl | 0.72 |
| 580 | 2-$OC_2H_5$, 5-F | 0.73 |
| 581 | 3-$OCH_3$, 4-$OCH_3$ | 0.75 |
| 582 | | 0.75 |

EXAMPLE 583

(a) When the 1,5-diamino-4,8-di(4-tosylamino)-2,6-di(3-methylphenoxy)anthraquinone prepared in Example 1a is reacted, in analogy to Example 165a, with 2-phenylethanol, then 1,5-diamino-4,8-di(4-tosylamino)-2,6-di(2-phenylethoxy)anthraquinone is obtained in good yield.

(b) When the product obtained is cleaved in 90 percent sulphuric acid in analogy to Example 165b, then 1,4,5,8-tetraamino-2,6-di(2-phenylethoxy)anthraquinone is obtained, the colour tint of which on silica gel is a blue with the Indicator Number 14 according to the Colour Index Hue Indication Chart.

(c) The abovementioned dyestuff has, in the liquid-crystal mixture mentioned in Example 1c, an order parameter S of 0.73. Similarly good order parameters are also found in other liquid-crystal mixtures, for example those mentioned on pages 15 and 16.

EXAMPLES 584 TO 589

When, in Example 583a, instead of 2-phenylethanol, other (substituted) alcohols are used, then, after cleavage according to Example 583b, analogous dyestuffs indicated in Table 17 are obtained, which, in the liquid-crystal mixture indicated in Example 1c, have the order parameters S indicated in the table and the colour tints of which on silica gel are a blue with the Indicator Number 14 according to the Colour Index Hue Indication Chart.

TABLE 17

Structure: anthraquinone with $NH_2$ at 1,4,5,8 positions, $OR$ at 2 and 6 positions.

| Example | R | S |
|---------|---|---|
| 584 | $-CH_2-CH_2-C_6H_4-CH_3$ (para) | 0.73 |
| 585 | $-CH_2-CH_2-C_6H_4-Cl$ (para) | 0.73 |
| 586 | $-CH_2-CH_2-C_6H_4-F$ (para) | 0.74 |
| 587 | $-CH_2-CH_2-C_6H_4-F$ (ortho) | 0.73 |
| 588 | $-CH_2-CH_2-C_6H_4-OCH_3$ (para) | 0.70 |

TABLE 17-continued

| Example | R | S |
|---------|---|---|
| 589 | $-(CH_2)_3-C_6H_5$ | 0.71 |

EXAMPLE 590

(a) When 1,5-diamino-4,8-di(4-tosylamino)-2,6-dibromoanthraquinone is reacted with sodium bisulphide in analogy to the procedure in U.S. Pat. No. 2,992,240, Example 13, then 1,5-diamino-4,8-di(4-tosylamino)-2,6-dimercaptoanthraquinone is obtained.

(b) When the abovementioned dimercaptan is alkylated with dimethyl sulphate in accordance with the procedure of U.S. Pat. No. 2,992,240, Example 13, then 1,5-diamino-4,8-di(4-tosylamino)-2,6-dimethylmercaptoanthraquinone is obtained.

(c) When the reaction product obtained in (b) is cleaved with 90 percent sulphuric acid in analogy to Example 1b, then 1,4,5,8-tetraamino-2,6-dimethylmercaptoanthraquinone is obtained, the colour tint of which on silica gel is a blue with the Indicator Number 15 according to the Colour Index Hue Indication Chart.

(d) The compound in Example 590b can also be obtained by reacting 1,5-diamino-4,8-di(4-tosylamino)-2,6-dibromoanthraquinone with methyl mercaptan.

(e) The dyestuff prepared in Example 590c has, in the liquid-crystal mixture mentioned in Example 1c, an order parameter S of 0.71.

EXAMPLES 591 TO 599

When, in Example 590a, other β-halogenoanthraquinones, for example those mentioned in Examples 57a, 190a, 293a, 303a, 338a, 348a to 351a, 415a to 418a, 450a, 467b, 468b, 469a, 470a, 525a or 526a, and the mercaptans obtained are reacted with the appropriate alkylating agents, or when the abovementioned β-halogenoanthraquinones are reacted with the appropriate mercaptans in analogy to Example 590d, and the compounds obtained according to the first or second process are cleaved, if appropriate as indicated in Example 590c, then the dyestuffs indicated in Table 18 are obtained, which have the order parameter S indicated in the table.

TABLE 18

| Example | Structure | S |
|---------|-----------|---|
| 591 | 1,4,5,8-tetraamino-anthraquinone with $-S-(CH_2)_2-C_6H_5$ groups at 2 and 6 positions | 0.72 |

TABLE 18-continued

| Example | | S |
|---|---|---|
| 592 | [structure: 1,4,5,8-tetraamino anthraquinone with C4H9S groups at 2,7 positions] | 0.70 |
| 593 | [structure: 1,4,5,8-tetraamino anthraquinone with benzyl-S (CH2-S-C6H5) groups at 2,7 positions] | 0.73 |
| 594 | [structure: 1,8-diamino-4,5-dihydroxy anthraquinone with C4H9S groups at 2,7 positions] | 0.68 |
| 595 | [structure: 1,8-diamino-4,5-dihydroxy anthraquinone with C6H5-CH2CH2-S groups at 2,7 positions] | 0.69 |
| 596 | [structure: anthraquinone with NH2, OH, NH2, OH and two S-(CH2)2-C6H5 groups] | 0.67 |
| 597 | [structure: 1,4,5,8-tetraamino anthraquinone with C4H9-S at one position and O-phenyl at another] | 0.74 |
| 598 | [structure: 1-amino-4-hydroxy-6-chloro anthraquinone with S-C4H9 at 2-position] | 0.66 |
| 599 | [structure: 1,4-diamino-6-chloro anthraquinone with S-CH2-CH2-C6H5 at 2-position] | 0.68 |

We claim:
1. A liquid-crystalline material containing at least one dyestuff fof the formula

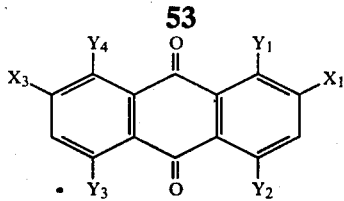

in which

Y$_1$, Y$_2$, Y$_3$, Y$_4$ designate amino, alkylamino, arylamino, cycloalkylamino, aralkylamino, it being possible for the hydrocarbon radicals to be substituted, X$_1$, X$_3$ represent halogen, with the proviso that only one of X$_1$ or X$_3$ can be halogen, an unsubstituted heterocyclic radical or a heterocyclic radical substituted by halogen, C$_1$–C$_4$-alkyl, phenyl C$_1$–C$_4$-alkoxy or C$_1$–C$_4$-alkylthio or —OR$_1$, R$_1$ denoting unsubstituted alkyl or alkyl substituted by C$_1$–C$_4$-alkoxy, C$_1$–C$_4$-alkylthio, hydroxy, phenoxy, phenyl or halogen, it being possible for the alkyl chain to be substituted by an oxygen atom or several non-adjacent oxygen atoms, or R$_1$ denotes an unsubstituted aryl or aryl substituted by halogen, C$_1$–C$_4$-alkyl, C$_1$–C$_4$-alkoxy, C$_1$–C$_4$-alkylthio, —NO$_2$, —CN, —CF$_3$, C$_1$–C$_4$-alkylamino, or C$_1$–C$_4$-dialkylamino, unsubstituted cycloalkyl or cycloalkyl substituted by C$_1$–C$_4$-alkoxy, C$_1$–C$_4$-alkylthio, hydroxyl, phenoxy, phenyl or halogen unsubstituted aralkyl or aralkyl substituted in the aryl moiety by halogen, C$_1$–C$_4$-alkyl, C$_1$–C$_4$-alkoxy, C$_1$–C$_4$-alkylthio, —NO$_2$, —CN, —CF$_3$, C$_1$–C$_4$-alkylamino, or C$_1$–C$_4$-dialkylamino or an unsubstituted heterocyclic radical or a heterocyclic radical substituted by halogen, C$_1$–C$_4$-alkyl, phenyl, C$_1$–C$_4$-alkoxy or C$_1$–C$_4$-alkylthio.

2. A liquid-crystalline material according to claim 1 containing 0.01 to about 30% by weight of said dyestuff.

3. A liquid-crystalline material according to claim 1 containing about 0.1 to about 10% by weight of said dyestuff.

4. A liquid-crystalline material according to claim 1 containing at least one dyestuff of said formula wherein X$_1$ and X$_3$ denote halogen, with the proviso that only one of X$_1$ or X$_3$ can be halogen, an unsubstituted heterocyclic radical or a heterocyclic radical substituted by halogen, C$_1$–C$_4$-alkyl, phenyl, C$_1$–C$_4$-alkoxy or C$_1$–C$_4$-alkylthio or —OR$_1$ wherein R$_1$ designates an unsubstituted aryl or an aryl substituted by halogen, C$_1$–C$_4$-alkyl, C$_1$–C$_4$-alkoxy, C$_1$–C$_4$-alkylthio, —NO$_2$, —CN, —CF$_3$, C$_1$–C$_4$-alkylamino, or C$_1$–C$_4$-dialkylamino, unsubstituted cycloalkyl or cycloalkyl substituted by C$_1$–C$_4$-alkoxy, C$_1$–C$_4$-alkylthio, hydroxyl, phenoxy, phenyl or halogen unsubstituted aralkyl or aralkyl substituted in the aryl moiety by halogen, C$_1$–C$_4$-alkyl, C$_1$–C$_4$-alkoxy, C$_1$–C$_4$-alkylthio, —NO$_2$, —CN, —CF$_3$, C$_1$–C$_4$-alkylamino, or C$_1$–C$_4$-dialkylamino or an unsubstituted heterocyclic radical or a heterocyclic radical substituted by halogen, C$_1$–C$_4$-alkyl, phenyl, C$_1$–C$_4$-alkoxy or C$_1$–C$_4$-alkylthio.

5. A liquid-crystalline material according to claim 1 containing at least one dyestuff of said formula where X$_1$ and X$_3$ each represent —OR$_1$ wherein R$_1$ represents an optionally substituted aryl or an optionally substituted heterocyclic radical and Y$_1$, Y$_2$, Y$_3$ and Y$_4$ are each amino.

6. A liquid-crystalline material according to claim 1 containing at least one dyestuff of said formula wherein each of said Y$_1$, Y$_2$, Y$_3$ and Y$_4$ is amino;

X$_1$ represents —OR$_1$ and

X$_3$ represents bromo.

7. A liquid-crystalline material according to claim 1 wherein said dyestuff is 1,4,5,8-tetraamino-2,7-di(2-chlorophenoxy)anthraquinone.

8. A liquid-crystalline material according to claim 1 wherein said dyestuff is 1,4,5,8-tetraamino-2,7-diphenoxy-anthraquinone.

9. A liquid-crystalline material according to claim 1 wherein said dyestuff is 1,4,5,8-tetraamino-2,7-di-(4-methylphenoxy)-anthraquinone.

10. A liquid-crystalline material containing at least one dyestuff of the formula

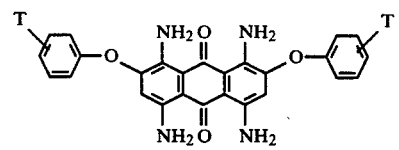

wherein

T designates hydrogen, alkyl, it being possible for the alkyl chain to be interrupted by 1–3 non-adjacent O atoms, alkoxy, it being possible for the C chain of the alkoxy radical to be interrupted by 1–3 non-adjacent O atoms, halogen, —CF$_3$, —CN, alkylthio, arylthio, aryl, (C$_1$–C$_8$-alkoxy)carbonyl, cyclohexyloxy-carbonyl, phenoxycarbonyl, benzyloxycarbonyl, (C$_1$–C$_8$-alkyl)carbonyloxy, cyclohexyl-carbonyloxy or benzoyloxy.

11. A liquid crystalline material according to claim 10, wherein

T designates hydrogen, C$_1$–C$_6$-alkyl, it being possible for the alkyl chain to be interrupted by 1–3 non-adjacent O atoms, C$_1$–C$_6$-alkoxy, it being possible for the chain of the alkoxy radical to be interrupted by 1–3 non-adjacent O atoms, chlorine, bromine or fluorine, —CF$_3$, —CN, C$_1$–C$_6$-alkylthio, phenylthio, phenyl, (C$_1$–C$_8$-alkoxy)carbonyl, cyclohexyloxycarbonyl, phenoxycarbonyl, benzyloxycarbonyl, (C$_1$–C$_8$-alkyl)carbonyloxy, cyclohexylcarbonyloxy and benzoyloxy.

12. A liquid-crystalline material containing at least one of the formula

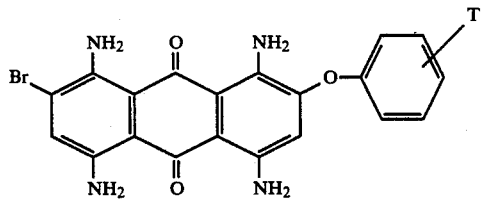

wherein

T designates hydrogen, alkyl, it being possible for the alkyl chain to be interrupted by 1–3 non-adjacent O atoms, alkoxy, it being possible for the C chain of the alkoxy radical to be interrupted by 1–3 non-adjacent O atoms, halogen, —CF$_3$, —CN, alkylthio, arylthio, aryl (C$_1$–C$_8$-alkoxy)carbonyl, cyclohexyloxycarbonyl, phenoxycarbonyl, benzyloxycarbonyl, ($C_1$–$C_8$-alkyl)carbonyloxy, cyclohexylcarbonyloxy or benzoyloxy.

13. A liquid-crystalline material according to claim 12 wherein

T designates hydrogen, $C_1$–$C_6$-alkyl, it being possible for the alkyl chain to be interrupted by 1–3 non-adjacent O atoms, $C_1$–$C_6$-alkoxy, it being possible for the C chain of the alkoxy radical to be interrupted by 1–3 non-adjacent O atoms, chlorine, bromine or fluorine, —$CF_3$, —CN, $C_1$–$C_6$-alkylthio, phenylthio, phenyl, ($C_1$–$C_8$-alkoxy)carbonyl, cyclohexyloxycarbonyl, phenoxycarbonyl, benzyloxycarbonyl, ($C_1$–$C_8$-alkyl)carbonyloxy, cyclohexylcarbonyloxy and benzoyloxy.

* * * * *

UNITED STATES PATENT AND TRADEMARK OFFICE
CERTIFICATE OF CORRECTION

PATENT NO. : 4,689,171

DATED : August 25, 1987

INVENTOR(S) : Martin Blunck, et al.

It is certified that error appears in the above-identified patent and that said Letters Patent is hereby corrected as shown below:

| | |
|---|---|
| Col. 9, line 44 | Correct spelling of --contain-- |
| Col. 11, line 35 | Before "41.6" insert --(a)-- |
| Col. 20, line 42 | Delete "189" and substitute --188-- |
| Col. 22, Example 222, under "R" | Delete "3-O-1-$C_3H_7$" and substitute --3-O-i-$C_3H_7$-- |
| Col. 22, Example 228, under "R" | Delete "4-O-t-$C_5H_{11}$" and substitute --4-O-n-$C_5H_{11}$-- |
| Col. 22, Example 234, under "R" | Delete "4-O-t-$C_9H_{19}$" and substitute --4-O-n-$C_9H_{19}$-- |
| Col. 23, Example 267 under "R" | Delete "-$OCH_5$" and substitute -- -$OCH_3$-- |
| Col. 26, line 46 | Delete "direction" and substitute --direaction-- |
| Col. 30, line 48 | Before 41 g" insert an extra space |
| Col. 30, line 66 | Before "Example" delete "of" and substitute --in-- |
| Col. 36, Example 439 under "R " | Delete "$CH_2$" and substitute --$CH_3$-- |
| Col. 42, line 27 | Delete "Number" and substitute --Numbers-- |
| Col. 43, line 59 | After "distilled" insert --, about 200 to 300 ccm of n-pentanol being distilled-- |
| Col. 45, line 62 | After "phenylethoxy)-" delete "B" |

UNITED STATES PATENT AND TRADEMARK OFFICE
CERTIFICATE OF CORRECTION

PATENT NO. : 4,689,171

DATED : August 25, 1987

INVENTOR(S) : Martin Blunck, et al.

It is certified that error appears in the above-identified patent and that said Letters Patent is hereby corrected as shown below:

Col. 47, line 65          Before "6 g" insert an extra space
Col. 51, line 68          Delete "fof" and substitute --of--
Col. 53, line 20          Delete "hydroxy" and substitute --hydroxyl--

Signed and Sealed this

Seventeenth Day of May, 1988

Attest:

DONALD J. QUIGG

*Attesting Officer*          *Commissioner of Patents and Trademarks*